US011732967B2

(12) United States Patent
Rousselet et al.

(10) Patent No.: US 11,732,967 B2
(45) Date of Patent: Aug. 22, 2023

(54) HEAT EXCHANGER SYSTEM WITH MACHINE-LEARNING BASED OPTIMIZATION

(71) Applicant: Baltimore Aircoil Company, Inc., Jessup, MD (US)

(72) Inventors: Yohann Lilian Rousselet, Boston, MA (US); Ellie M. Litwack, Columbia, MD (US)

(73) Assignee: Baltimore Aircoil Company, Inc., Jessup, MD (US)

( * ) Notice: Subject to any disclaimer, the term of this patent is extended or adjusted under 35 U.S.C. 154(b) by 340 days.

(21) Appl. No.: 17/118,818

(22) Filed: Dec. 11, 2020

(65) Prior Publication Data
US 2021/0180891 A1    Jun. 17, 2021

Related U.S. Application Data

(60) Provisional application No. 62/946,778, filed on Dec. 11, 2019.

(51) Int. Cl.
*F28C 1/14*  (2006.01)
*G05B 13/04*  (2006.01)
(Continued)

(52) U.S. Cl.
CPC ............ *F28C 1/14* (2013.01); *F24F 11/70* (2018.01); *F28D 5/00* (2013.01); *F28F 27/003* (2013.01);
(Continued)

(58) Field of Classification Search
CPC ...... F24F 11/70; F24F 2140/60; F24F 5/0035; F24F 2140/12; F24F 2140/20; F28D 5/00;
(Continued)

(56) References Cited

U.S. PATENT DOCUMENTS 3,367,413 A    2/1968 Forster
3,754,738 A    8/1973 Blazer
(Continued)

FOREIGN PATENT DOCUMENTS

CA    2808810 A1    9/2013
DE    3030439 A1    3/1982
(Continued)

OTHER PUBLICATIONS

PCT Search Report and Written Opinion from related International Patent Application No. PCT/US2020/064459; dated Mar. 10, 2021; 39 pages.
(Continued)

*Primary Examiner* — Kidest Bahta
(74) *Attorney, Agent, or Firm* — Fitch, Even, Tabin & Flannery LLP

(57) ABSTRACT

In one aspect, a heat exchanger system is provided that includes a cooling system and a sensor configured to detect a variable of the cooling system. The heat exchanger system includes processor circuitry configured to provide the variable and a plurality of potential operating parameters of the cooling system to a machine learning model representative of the cooling system to estimate at least one of energy consumption, water usage, and chemical usage for the potential operating parameters. The processor circuitry is further configured to determine, based at least in part on the estimated at least one of energy consumption, water usage, and chemical consumption, for the potential operating parameters, an optimal operating parameter of the cooling system to satisfy a target optimization criterion.

55 Claims, 16 Drawing Sheets

(51) Int. Cl.
*G05B 13/02* (2006.01)
*F28D 5/00* (2006.01)
*F28F 27/00* (2006.01)
*F24F 11/70* (2018.01)
*F24F 140/60* (2018.01)

(52) U.S. Cl.
CPC ........ *G05B 13/0265* (2013.01); *G05B 13/042* (2013.01); *F24F 2140/60* (2018.01); *G05B 2219/2639* (2013.01); *G05B 2219/31264* (2013.01)

(58) Field of Classification Search
CPC ............... F28F 27/003; F28F 2200/00; G05B 13/0265; G05B 13/042; G05B 2219/2639; G05B 2219/31264; G05B 2219/2614; Y02B 30/54; F28C 2001/006; F28C 1/02
See application file for complete search history.

(56) References Cited

U.S. PATENT DOCUMENTS

| | | | |
|---|---|---|---|
| 3,923,935 A | 12/1975 | Cates | |
| 3,998,394 A | 12/1976 | Ovard | |
| 4,028,440 A | 6/1977 | Engalitcheff, Jr. | |
| 4,076,771 A | 2/1978 | Houx, Jr. | |
| 4,418,023 A | 11/1983 | Dolan | |
| 4,637,225 A | 1/1987 | Marshall | |
| 4,662,902 A | 5/1987 | Meyer-Pittroff | |
| 5,226,285 A | 7/1993 | Dankowski | |
| 5,273,687 A | 12/1993 | Osborne | |
| 5,431,858 A | 7/1995 | Harrison, Jr. | |
| 5,435,382 A | 7/1995 | Carter | |
| 5,449,036 A | 9/1995 | Genge | |
| 5,585,047 A | 12/1996 | Mortensen | |
| 5,724,828 A | 3/1998 | Korenic | |
| 5,775,409 A | 7/1998 | Goto | |
| 5,816,315 A | 10/1998 | Stark | |
| 5,816,318 A | 10/1998 | Carter | |
| 5,944,094 A | 8/1999 | Kinney, Jr. | |
| 5,994,094 A | 11/1999 | Hoetten | |
| 6,047,555 A | 4/2000 | Weng | |
| 6,142,219 A | 11/2000 | Korenic | |
| 6,213,200 B1 | 4/2001 | Carter | |
| 6,260,830 B1 | 7/2001 | Harrison | |
| 6,427,461 B1 | 8/2002 | Whinery | |
| 6,446,941 B1 | 9/2002 | Maheshwari | |
| 6,564,864 B2 | 5/2003 | Carter | |
| 6,574,980 B1 | 6/2003 | Morrison | |
| 6,663,694 B2 | 12/2003 | Hubbard | |
| 6,684,943 B2 | 2/2004 | Dobbs | |
| 7,107,782 B2 | 9/2006 | Carter | |
| 7,128,310 B2 | 10/2006 | Mockry | |
| 7,310,958 B2 | 12/2007 | Carter | |
| 7,328,886 B2 | 2/2008 | Mockry | |
| 7,484,718 B2 | 2/2009 | Facius | |
| 7,603,774 B2 | 10/2009 | Facius | |
| 7,802,774 B2 | 9/2010 | Facius | |
| 8,412,357 B2 | 4/2013 | Seem | |
| 8,434,746 B2 | 5/2013 | Carter | |
| 8,483,883 B1 | 7/2013 | Watson | |
| 8,676,385 B2 | 3/2014 | Myers | |
| 8,833,741 B2 | 9/2014 | Mockry | |
| 9,004,463 B2 | 4/2015 | Carter | |
| 9,057,563 B2 | 6/2015 | Carter | |
| 9,057,564 B2 | 6/2015 | Carter | |
| 9,182,753 B2 | 11/2015 | Benosman | |
| 9,243,847 B2 | 1/2016 | Benz | |
| 9,255,739 B2 | 2/2016 | Aaron | |
| 9,279,619 B2 | 3/2016 | Aaron | |
| 9,587,885 B2 | 3/2017 | Aaron | |
| 9,995,533 B2 | 6/2018 | Aaron | |
| 10,132,577 B2 | 11/2018 | Martell | |
| 10,222,146 B2 | 3/2019 | Mockry | |
| 10,288,351 B2 | 5/2019 | Aaron | |
| 10,365,001 B2 | 7/2019 | Salsbury | |
| 10,401,843 B2 | 9/2019 | House | |
| 10,415,902 B2 | 9/2019 | Shin | |
| 10,619,953 B2 | 4/2020 | Blay | |
| 10,627,176 B2 | 4/2020 | Shin | |
| 10,677,543 B2 | 6/2020 | Auth | |
| 11,029,093 B2 | 6/2021 | Shin | |
| 11,092,394 B2 | 8/2021 | Blay | |
| 11,287,191 B2 | 3/2022 | Aaron | |
| 2003/0070547 A1 | 4/2003 | Hubbard | |
| 2003/0071373 A1 | 4/2003 | Hubbard | |
| 2004/0080060 A1 | 4/2004 | Mockry | |
| 2004/0196631 A1 | 10/2004 | Ueda | |
| 2004/0231824 A1* | 11/2004 | Paolillo | G05D 23/1917 165/11.1 |
| 2005/0012230 A1 | 1/2005 | Kammerzell | |
| 2005/0077637 A1 | 4/2005 | Mockry | |
| 2007/0101746 A1 | 5/2007 | Schlom | |
| 2007/0187851 A1 | 8/2007 | Facius | |
| 2008/0018001 A1 | 1/2008 | Kammerzell | |
| 2008/0041087 A1 | 2/2008 | Muller | |
| 2008/0115921 A1 | 5/2008 | Hall | |
| 2010/0010681 A1 | 1/2010 | Zugibe | |
| 2010/0042453 A1* | 2/2010 | Scaramellino | G06Q 10/06 705/308 |
| 2010/0154448 A1 | 6/2010 | Hay | |
| 2010/0281896 A1 | 11/2010 | Al Watban | |
| 2010/0315770 A1 | 12/2010 | Tipley | |
| 2010/0326091 A1 | 12/2010 | Enayati | |
| 2011/0100593 A1 | 5/2011 | Benz | |
| 2011/0113798 A1 | 5/2011 | Pichai | |
| 2011/0168354 A1 | 7/2011 | De Jong | |
| 2011/0227236 A1 | 9/2011 | Vouche | |
| 2011/0289951 A1 | 12/2011 | Furlong | |
| 2012/0067546 A1 | 3/2012 | Bugler, III | |
| 2013/0113127 A1 | 5/2013 | Yang | |
| 2013/0228941 A1 | 9/2013 | Bogh | |
| 2014/0209279 A1 | 7/2014 | Aaron | |
| 2014/0216688 A1 | 8/2014 | Shelnutt | |
| 2014/0229146 A1 | 8/2014 | Gonzalez | |
| 2015/0068708 A1 | 3/2015 | Mockry | |
| 2015/0069643 A1 | 3/2015 | Mockry | |
| 2016/0018125 A1* | 1/2016 | Hamstra | F24F 11/62 703/7 |
| 2016/0178262 A1* | 6/2016 | Rocha | F25B 25/005 62/98 |
| 2016/0313751 A1 | 10/2016 | Risbeck | |
| 2016/0363388 A1 | 12/2016 | Egolf | |
| 2017/0003078 A1 | 1/2017 | Vadder | |
| 2017/0284742 A1 | 10/2017 | Aaron | |
| 2018/0100700 A1 | 4/2018 | Beaver | |
| 2018/0100701 A1 | 4/2018 | Beaver | |
| 2018/0100703 A1 | 4/2018 | Beaver | |
| 2018/0202710 A1* | 7/2018 | Miller | F28C 1/00 |
| 2018/0224174 A1 | 8/2018 | Hollander | |
| 2019/0145721 A1 | 5/2019 | Blay | |
| 2019/0195524 A1 | 6/2019 | Carter | |
| 2019/0212075 A1 | 7/2019 | Shin | |
| 2020/0300553 A1 | 9/2020 | Aaron | |

FOREIGN PATENT DOCUMENTS

| | | |
|---|---|---|
| EP | 0172403 B1 | 3/1988 |
| EP | 0264316 A1 | 4/1988 |
| EP | 0365815 B2 * | 8/1999 |
| EP | 1698847 A1 | 9/2006 |
| JP | 2007285620 A | 11/2007 |
| KR | 101663258 B1 | 10/2016 |
| WO | 2005005905 A1 | 1/2005 |
| WO | 2007015281 A2 | 2/2007 |
| WO | 2010020160 | 2/2010 |
| WO | 2010037164 A1 | 4/2010 |
| WO | 2012114134 A1 | 8/2012 |
| WO | 2015059038 A1 | 4/2015 |
| WO | 2018004464 | 1/2018 |

(56) References Cited

OTHER PUBLICATIONS

3C Condenser Heat Rejection Systems—SH09 Series Microchannel, Installation, Operation & Maintenance Manual Muller Industries; publicly available before Jan. 20, 2014; 30 pages.

Baltimore Aircoil Company; Chapter 15: Plume Abatement; pp. 87-88; publicly available before Mar. 19, 2019; 2 pages.

Baltimore Aircoil Company; product overview of HXC: Principle of Operation from https://www.baltimoreaircoil.eu/en/products/HXC-principle-of-operation; publicly available before Mar. 19, 2019; 1 page.

Baltimore Aircoil International nv; Product Report: BAC's Expertise from plume prediction to solution brochure; publicly available before Mar. 19, 2019; 2 pages.

Lindahl, Jr., Paul; JAameson, Randall W.; Plume Abatement and Water Conversation with the Wet/Dry Cooling Tower; Presented at the 1993 Cooling Tower Institute Annual Meeting, Technical Paper No. TP93-01; Feb. 1993; 33 pages.

TrilliumSeries™ Condenser—Rigging, Operation & Maintenance Manual; Baltimore Aircoil Company; M450/I-E; 2013; 20 pages.

TrilliumSeries™ Condenser; brochure from Baltimore Aircoil Company; S410/I-C; 2013; 12 pages.

Arteaga, Johnathan A.F. et al.; Prediction Method for the Performance of a Chiller Following a Cooling Load Profile; CONEM 2010 VI National Congress of Mechanical Engineering, Aug. 18-21, 2010 Campina Grande, Paraiba, Brazil; 10 pages.

Bonneville Power Administration; Electric Ideas Clearinghouse—Bulletin Board—Technology Update: Optimizing Dooling Tower Performance; Nov. 1991; 4 pages.

Carrier Corporation; Carrier® Chiller System Profiles—A Guide for Chilled Water Plant Operation; brochure; Copyright 1998; 4 pages.

Chilled Water System Analysis Tool (CWSAT), Version 2.1—User's Manual; Oct. 2005; The University of Massachusetts College of Engineering Department of Mechanical & Industrial Engineering, Amherst, MA; 34 pages.

Conserve it PTY LTD; PlantPro® brochure from https://www.conserveitiot.com/plantpro; publicly available before Dec. 11, 2019; 13 pages.

CoolTools™ Chilled Water Plant Design Guide; Energy Design Resources; Dec. 2009; 281 pages.

DeepMind AI Reduces Google Data Centre Cooling Bill by 40%; Blog Post from https://deepmind.com/blog/artide/deepmind-ai-reduces-google-data-centre-cooling-bill-40; Jul. 20, 2016; 6 pages.

Dempster, Ian; Machine Learning and Chiller System Optimization; brochure from https://www.districtenergy.org/HigherLogic/System/DownloadDocumentFile.ashx?DocumentFileKey=455e8aa2-5764-d402-ecda-89078853ddc7; Feb. 2015; 13 pages.

Deru, Michael et al.; U.S. Department of Energy Commercial Reference Building Models of the National Building Stock; Technical Report NREL/TP-5500-46861; National Renewable Energy Laboratory; Feb. 2011; 118 pages.

Energy Center of Wisconsin; Fact Sheet: Evaporative Condenser Control—Techniques to Cut Energy Waste in Large Refrigeration Systems; Copyright 2001; 2 pages.

Fan, Guo-Feng et al.; Application of the Weighted K-Nearest Neighbor Algorithm for Short-Term Load Forecasting; Energies 2019, 12, 916; doi:10.3390/en12050916; 19 pages; published Mar. 9, 2019.

Furlong, James W. et al.; Optimization of Water—Cooled Chiller—Cooling Tower Combinations; CTI Journal, vol. 26, No. 1; p. 12-19; 2005; 8 pages.

García Cutillas, Clemente et al.; Optimum Design and Operation of an HVAC Cooling Tower for Energy and Water Conservation; Energies 2017, 10, 299; doi:10.3390/en10030299; 27 pages; published Mar. 3, 2017.

Geister, W. Ryan et al.; A Closer Look at Chiller Ratings; ASHRAE Journal; Dec. 2009, p. 22-32; 8 pages.

GNV GL; Impact Evaluation of 2012 National Grid-Rhode Island Prescriptive Chiller Program; report prepared by KEMA, Inc.; Jul. 22, 2016; 35 pages.

Goel, S. et al.; Enhancements to ASHRAE Standard 90.1 Prototype Building Models; Prepared for the U.S. Department of Energy under Contract DE-AC05-76RL01830 by Pacific Northwest National Laboratory, Richland WA 99352; Apr. 2014; 59 pages.

Green Koncepts Pte Ltd; Chiller Plant Optimisation—Ultra Low Energy Management with IoT & Machine Learning Controls; brochure from http://greenbuildingreview.com/wp-content/uploads/2017/10/Track-1.3-Smart-Building-Roy-Arindam.pdf; publicly available before Dec. 11, 2019; 12 pages.

Hattori, Yuki et al.; The Relationship Between Heat Load Profile and Energy Efficiency in District heating and Cooling Plant; Proceedings of Building Simulation 2011: 12th Conference of International Building Performance Simulation Association, Sydney, Nov. 14-16; p. 1926-1933; 8 pages.

Ho, Simon; Trane® High Performance Chilled Water Systems; presentation; EarthWise HVAC Chiller—Tower Systems; Ingersoll Rand, Inc.; Sep. 2012; 18 pages.

Hydeman, Mark et al.; PG&E's CoolTools™ Project: A Toolkit to Improve Evaluation and Operation of Chilled Water Plants; Pacific Gas and Electric Company; Sep. 1997; 24 pages.

Hydronic and Heat Pump Control features from https://www.75f.io/solutions/equipment-type/hydronic-heat-pump-control; publicly available before Dec. 11, 2019; 8 pages.

Ingersoll Rand, Inc.; Trane® New myPLVTool Provides Quick, Simple Option for Chiller Economic Comparisons; brochure; Feb. 26, 2014; 4 pages.

Jekel, Todd B. et al.; Energy Efficiency Improvements; Industrial Refrigeration Consortium at the University of Wisconsin Madison, WI; Reta National Conference 2017; 78 pages.

Jekel, Todd; Condenser Controls & Control Strategies; presentation at IRC Research & Technology Forum, Madison, WI; May 10-11, 2017; 35 pages.

Johnson Controls; Applying Artifical Intelligence to Built Environments through Machine Learning; brochure from https://www.johnsoncontrols.com/-/media/jci/insights/2019/bts/bts_jci-661_dv_ai_learing_white_paper_020819_4p_f3.pdf, publicly available before Dec. 11, 2019; 4 pages.

Johnson Controls; HVAC&R Engineering Update: Use Only NPLV to Specify Chiller Effideny; brochure from www.johnsoncontrols.com; Copyright 2009; 4 pages.

Jourdan, Greg; Knowing When Your Chiller Isn't Energy Smart; presentation Energy/Fadlities Connections Washington State University; May 6, 2015; 132 pages.

Kim, Jee-Heon et al.; Modeling and Optimizing a Chiller System Using a Machine Learing Algorithm; Energies 2019, 12, 2860; doi:10.3390/en12152860; 13 pages; published Jul. 25, 2019.

Klawunder, Shawn Eric; Thesis: Modeling and Analysis of Chilled Water Systems; Requirement for the Degree Master of Science in Mechanical Engineering at Georgia Institute of Technology, Apr. 2000; 158 pages.

Lee, W.L. et al.; Developing a Simplified Model for Evaluating Chiller-System Configurations; Applied Energy 84 (2007) 290-306; 17 pages.

Lei, Zhao et al.; Dynamic Simulation and Analysis of a Water Chiller Refrigeration System; Applied Thermal Engineering 25 (2005) 2258-2271; 14 pages.

Li, Xiao et al.; Self-Optimizing Control of Cooling Tower for Efficient Operation of Chilled Water Systems; Purdue University School of Mechanical Engineering, International High Performance Buildings Conference 2012; Paper 62; http://docs.lib.purdue.edu/ihpbc/62; 11 pages.

Navitas Captial; Whitepaper Artificial Intelligence (AI) for the Built World; Jun. 2019; 34 pages.

Peesel, Ron-Hendrik et al.; Optimization of Cooling Utility System with Continuous Self-Learning Perfomnance Models; Energies 2019, 12, 1926; doi:10.3390/en12101926; 17 pages; published May 20, 2019.

Pugh, Michael D.; Benefits of Water-Cooled Systems vs Air-Cooled Systems for Air-Conditioning Applications; presentation from Cooling Technology Institute (www.cti.org); publicly available before Dec. 11, 2019; 102 pages.

(56) References Cited

OTHER PUBLICATIONS

Schwedler, Mick et al.; Tower Water Temperature . . . Control It How??!; Engineers Newsletter, vol. 24, No. 1, 1995; The Trane Company; 5 pages.
Schwedler, Mick; Condenser Water System Savings—Optimizing Flow Rates and Control; Engineers Newsletter, vol. 41, No. 3; Trane® a business of Ingersoll Rand; Sep. 2012; 8 pages.
SPX Cooling Technologies, Inc.; Marley® Improving Energy Efficiency in Cooling Tower Design; presentation; publicly available before Dec. 11, 2019; 24 pages.
Stocki, Michael et al.; Benchmarking an Energy Evaluation Tool for Chilled Water Systems; published by The American Counsil for an Energy-Efficient Economy (ACEEE); 2001; p. 429-440; 12 pages.
Sullivan, Brian; Chiller Selection Made Easier with myPLV™; Engineers Newsletter, vol. 44, No. 4; Trane® a business of Ingersoll Rand; Dec. 2015; 12 pages.
Taylor, Steven T.; Optimizing Design & Control of Chilled Water Plants—Part 5: Optimized Control Sequences; ASHRAE Journal; Jun. 2012; p. 56-74; 20 pages.
Tiessen, Alex et al.; Chapter 14: Chiller Evaluation Protocol—The Uniform Methods Project: Methods for Determining Energy Efficiency Savings for Specific Measures; Subcontract Report NREL/SR-7A40-62431; National Renewable Energy Laboratory; Sep. 2014; 24 pages.
U.S. Department of Energy—Hospital Energy Alliance; Fact Sheet: Hospitals Benefit by Improving Inefficient Chiller Systems; Aug. 2011; 2 pages.
Vallabhaneni, Kavita A.; Benefits of Water-Cooled Systems vs. Air-Cooled Systems for Air-Conditioning Applications; presentation from Cooling Technology Institute (www.cti.org); publicly available before Dec. 11, 2019; 88 pages.

\* cited by examiner

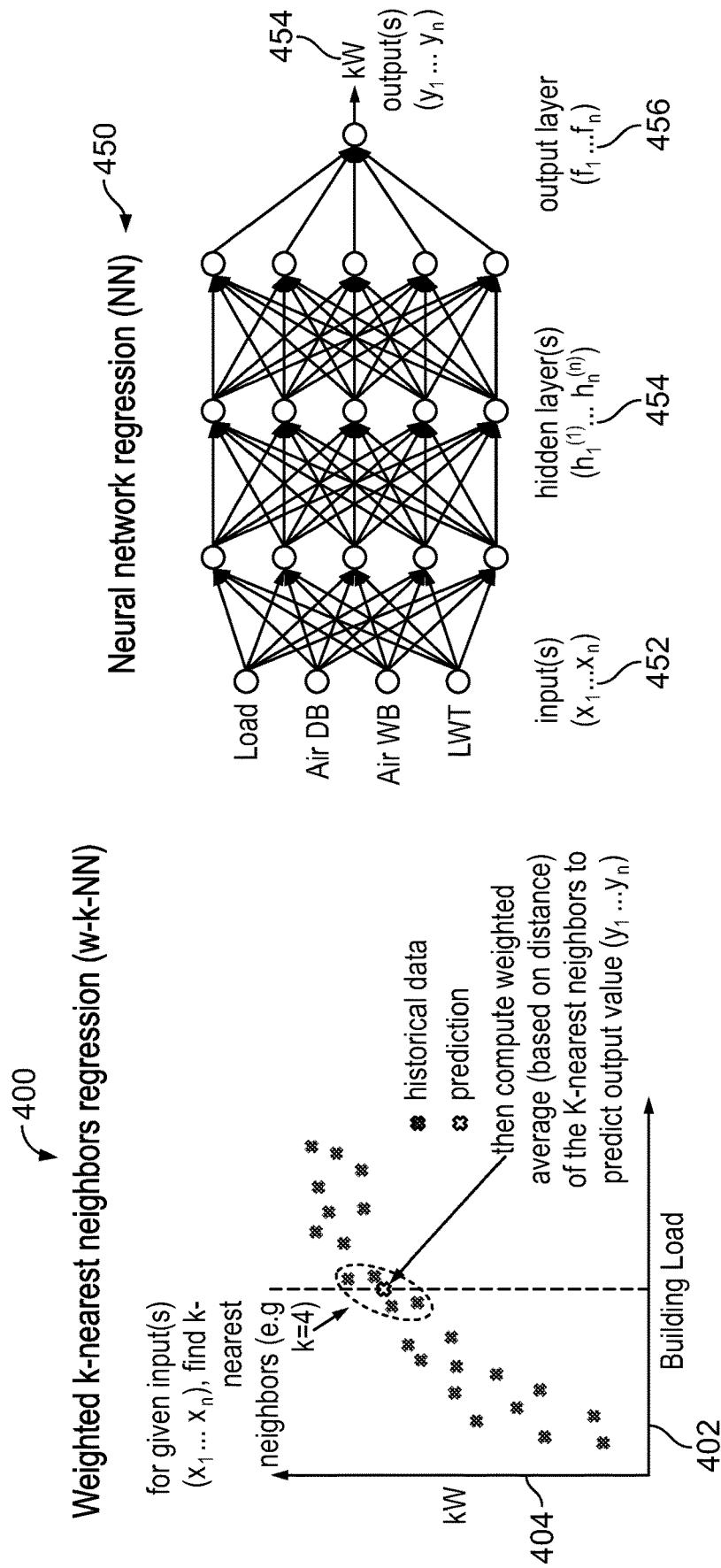

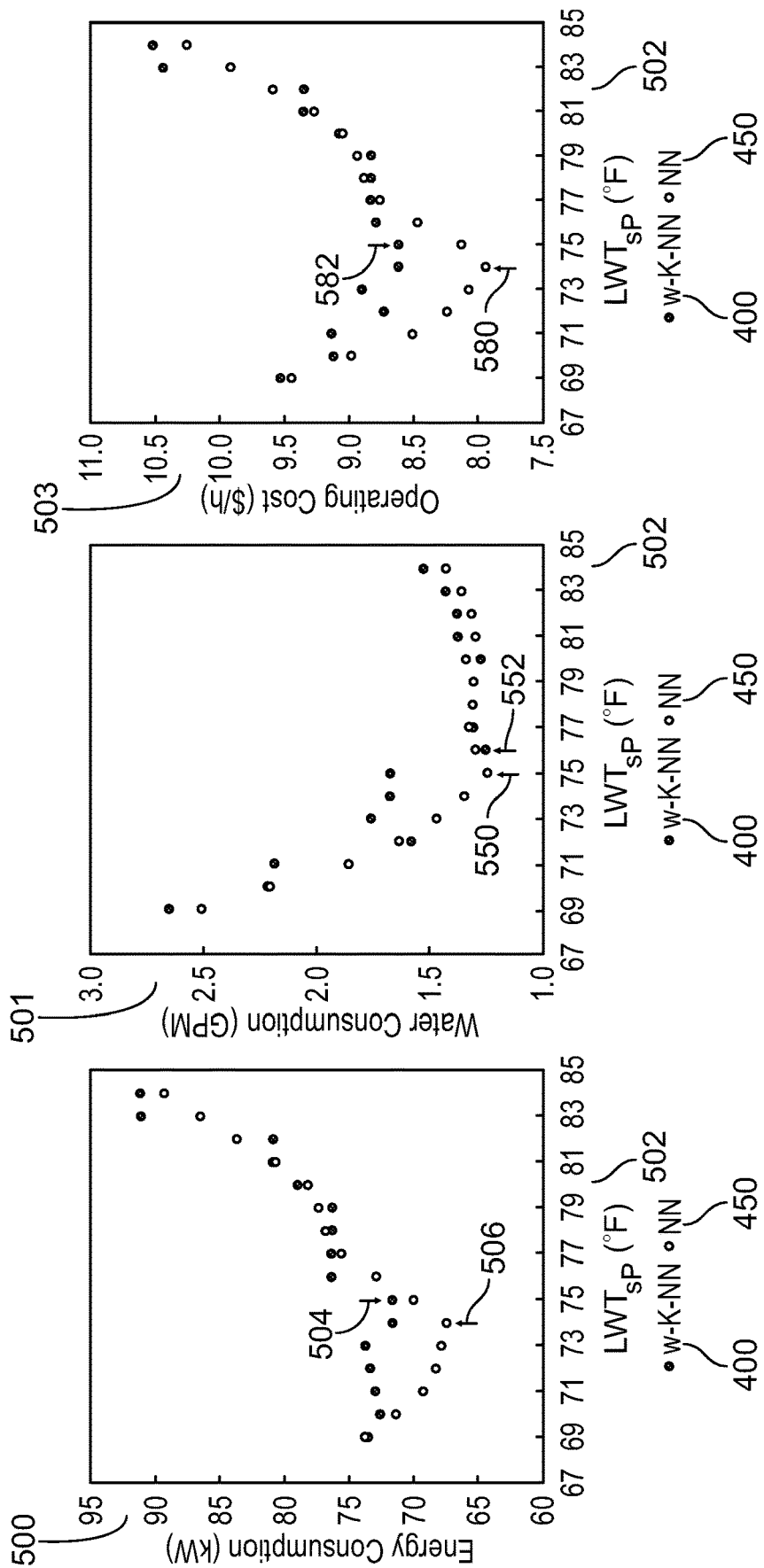

HEAT EXCHANGER SYSTEM WITH MACHINE-LEARNING BASED OPTIMIZATION

CROSS-REFERENCE TO RELATED APPLICATION

This application claims the benefit of U.S. Provisional Patent Application No. 62/946,778, filed Dec. 11, 2019, which is hereby incorporated herein by reference in its entirety.

FIELD

This disclosure relates to heat exchanger systems and, more specifically, to control systems for heat exchanger systems.

BACKGROUND

Heat exchanger systems, such as cooling systems, may be used for various applications such as cooling process fluid from an industrial process or cooling process fluid that absorbs heat from the interior of a building. For example, buildings utilize heating, ventilation, or air conditioning (HVAC) systems to provide desired air properties (e.g. temperature) within the building. HVAC systems may include a cooling system that removes heat from within the building and discharges the heat to the surrounding environment. Cooling systems may also include refrigeration systems such as those used in supermarkets, cold storage facilities, and ice-skating facilities.

Cooling systems often utilize cooling towers to transfer heat from a hotter process fluid to cooler ambient air. Some prior cooling towers include a variable speed fan that may be controlled to adjust the flow rate of air across a heat exchanger in the cooling tower to adjust the heat transfer between the process fluid and the air. Further, some cooling towers are configured to operate in different modes to meet the cooling demands of the HVAC system. For example, the cooling tower is able to switch between operation in a dry mode and a wet mode to meet the demands of the HVAC system. For example, the wet mode may involve the cooling tower distributing water onto an indirect heat exchanger of the cooling tower to utilize evaporative cooling to cool the process fluid. The cooling tower operating in the wet mode may cool the process fluid more efficiently but consumes water whereas the dry mode is less efficient but does not consume water. Some cooling systems include multiple cooling towers operating in series or parallel with one another to meet a cooling load of a building having one or more chillers. Where multiple cooling towers are used, the cooling towers may configured to switch between different modes of operation, such as dry, wet, and adiabatic modes. Some cooling systems may include ice thermal storage systems or chilled water storage systems to charge or store cooling capacity when the cooling demand and/or energy rates are low and utilize the stored cooling capacity when the cooling demand and/or energy rates are high.

One issue with some of these prior cooling systems is that they operate their cooling towers according to fixed rules or programming so that when certain conditions are present, the cooling tower operates in a certain mode and/or the fan of the cooling tower is operated at a certain speed. Since these cooling systems operate according to fixed rules, they often are not operating efficiently and consume more energy and/or more water than is necessary.

Some cooling systems are known that utilize artificial intelligence to control the operation of the cooling system. However, these prior systems often overlook how components of the cooling system interact to affect the overall operation of the cooling system. Additionally, some of these cooling systems are configured to optimize energy consumption, but do not account for the consumption of water and chemicals that are used by the cooling tower of the system. Since these systems do not account for all inputs utilized by the cooling system, these systems may not be able to accurately optimize the cost of operating the cooling system.

BRIEF DESCRIPTION OF THE DRAWINGS

FIG. 8 is a graphical representation of an example weighted k-nearest neighbor regression;

FIG. 9 is a graphical representation of an example neural network regression;

FIG. 10 is a scatterplot of estimated energy consumption by an example cooling subsystem predicted by machine learning models using a weighted k-nearest neighbor regression and a neural network regression for a range of leaving water temperature set points of a cooling tower of the cooling subsystem;

FIG. 11 is a scatterplot of estimated water usage by the cooling subsystem of FIG. 10 predicted by machine learning models using a weighted k-nearest neighbor regression and a neural network regression for a range of leaving water temperature set points of the cooling tower;

FIG. 12 is a scatter plot of estimated operating costs for the cooling subsystem of FIG. 10 predicted by machine learning models using a weighted k-nearest neighbor regression and a neural network regression for a range of leaving water temperature set points of the cooling tower;

DETAILED DESCRIPTION

Figure 1A:
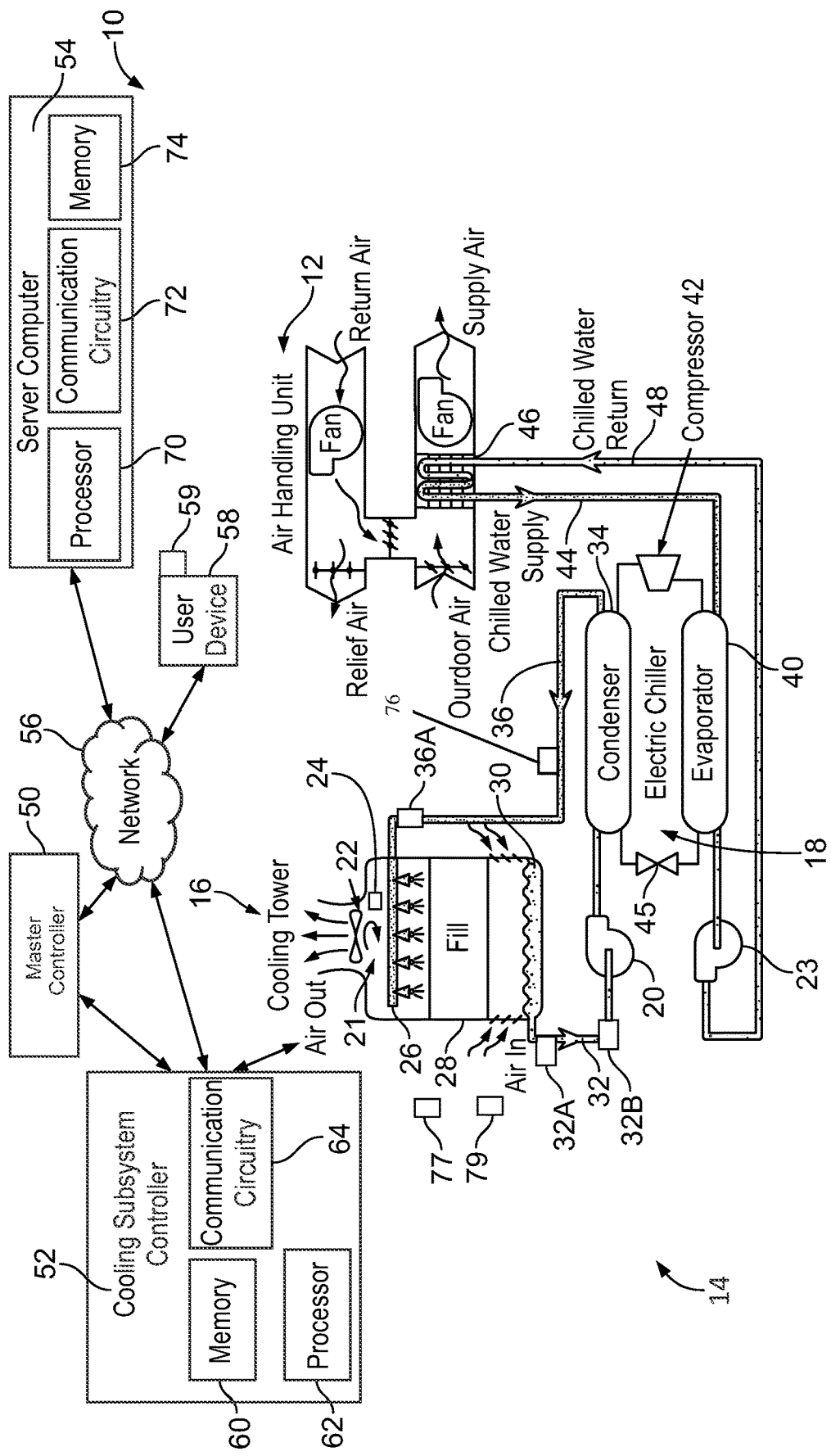
FIG. 1A is a schematic view of a cooling system including a cooling subsystem having a cooling tower, pump, and a chiller, FIG. 1A further showing a cooling subsystem controller in communication with a master controller and a server computer.

In accordance with one aspect of the present disclosure, a heat exchanger system having machine learning-based optimization is provided. In one embodiment, the heat exchanger system includes a cooling system comprising a heat generating apparatus, such as a chiller or a water source heat pump, configured to transfer heat to a process fluid. The heat generating apparatus may generate heat by removing the heat from another fluid. The cooling system further includes a heat rejection apparatus, such as cooling tower, configured to remove heat from the process fluid and a sensor configured to detect a variable of the cooling system. In some embodiments, the heat rejection apparatus includes a thermal energy storage system in addition to or instead of the cooling tower. For example, the thermal energy storage system may include an ice thermal storage system or a chilled water storage system.

The cooling system apparatus further includes processor circuitry configured to provide the variable and a plurality of potential parameters of the cooling subsystem to a machine learning model to estimate at least one of energy consumption, water usage, and chemical consumption of the cooling system for the potential operating parameters. The water usage of the cooling system may include, for example, the volume of makeup water added to the system, the flow rate of water being circulated in a system, and/or the speed of a water pump of the cooling system.

The processor circuitry is further configured to determine, based at least in part on the estimated at least one of energy consumption, water usage, and chemical consumption for the potential operating parameters, an optimal operating parameter of the cooling system to satisfy a target optimization criterion. In this manner, the processor circuitry may use the plurality of potential operating parameters with the machine learning model representative of the cooling system to predict how the cooling system would respond to the various operating parameters and may then select the optimal operating parameter that best satisfies the target optimization criterion.

The target optimization criterion may be, for example, minimizing energy consumption, minimizing water usage, minimizing chemical consumption, or minimizing cost. The target optimization criterion may include achieving a particular threshold value or a combination of threshold values. The target optimization criterion may include a plurality of target optimization criteria. For example, the target optimization criterion may include achieving a threshold water savings, a threshold energy savings, and/or a threshold cost savings. The use of target optimization criteria may permit an overall performance or optimization to be achieved for a particular system. As another example, the target optimization criterion may be defined in terms of a limit for a value, such as an upper limit on energy consumption, water usage, and/or cost.

The processor circuitry uses predictive and dynamic optimization based on historical, live, and/or future data to predict the optimal operating parameter that will achieve the target optimization criterion. In one embodiment, the optimal operating parameter includes at least one of an optimal operating mode of the heat rejection apparatus, an optimal temperature of the process fluid leaving the heat rejection apparatus, an optimal pressure of the process fluid leaving the heat rejection apparatus, and an optimal flow rate of the process fluid.

In one embodiment, the cooling system includes a pump operable to pump process fluid from the heat generating apparatus to the heat rejection apparatus. The interaction between the heat generating apparatus, pump, and heat rejection apparatus is typically characterized by three major metrics: energy consumption, water usage, and system operating cost. The processor circuitry may predict these metrics for operating conditions and parameters such as process fluid flow rate, leaving process fluid temperature, and operating mode using the machine learning model. Based on the predictions, the processor circuitry is able to recommend optimal operating parameter(s) for a given optimization criterion: minimizing energy consumption, minimizing water usage, or minimizing operating cost. The processor circuitry may also utilize the machine learning model to account for water and chemical usage to provide a more accurate estimate of the actual operating and maintenance cost of the cooling subsystem. The cost estimate may include the cost of chemical treatment consumption, water treatment, water fouling, and/or related water maintenance costs. The cost estimate may also or alternatively include other maintenance costs such as expected wear and tear of components and replacement of components according to usage schedules. The recommended optimal operating parameter(s) may also optimize the operating mode of the heat rejection apparatus, such as operating a cooling tower in a wet, dry, hybrid, or adiabatic mode, to achieve the desired optimization criterion.

In one embodiment, the processor circuitry utilizes a heat rejection apparatus-driven approach wherein the optimization is driven by the operation and performance of the heat rejection apparatus rather than being centered around a chiller or water source heat pump. Further, the processor circuitry performs optimization in real-time using live, historical, and/or predicted future data. In one embodiment, the processor circuitry includes a memory configured to include performance model(s) of the heat generating apparatus, pump, and/or heat rejection apparatus to provide a factory preset for the machine learning model that the processor circuitry may utilize when historical data is insufficient.

In one embodiment, the processor circuitry is configured to provide the plurality of potential parameters of the cooling system to the machine learning model to estimate power consumption and water usage for the potential operating parameters. The plurality of potential operating parameters may include a range of operating parameters that the cooling system is capable of operating at and/or within constraints (e.g., a maximum and minimum value) of the cooling system. The processor circuitry is further configured to determine, based at least in part on the estimated power consumption and water usage, the optimal operating parameter of the cooling system to satisfy the target optimization criterion. As one example, the operating parameters may be a fan speed and/or an amount of water dispensed by a water distribution system of the cooling system.

In one embodiment, the sensor includes one or more sensors configured to detect a malfunction in the cooling system. The processor circuitry is configured to determine the plurality of potential operating parameters to provide to the at least one machine learning model representative of the cooling system based at least in part on the detected malfunction. The processor circuitry then determines the optimal operating parameter of the cooling system to satisfy the target optimization criterion based at least in part on the detected malfunction. For example, if a variable speed fan of a cooling tower malfunctions and is stuck "on" at a fixed speed, the potential operating parameters provided to the machine learning model include the fixed speed whereas if the fan was fully operable the potential operating parameters may include a range of potential fan speeds.

The cooling system may include various components for exchanging heat. In one embodiment, the heat generating apparatus includes a chiller and the heat rejecting apparatus includes a cooling tower. In another embodiment, the cooling system further includes an air handling unit operably coupled to the chiller and a pump configured to pump process fluid between the chiller and the cooling tower.

In one embodiment, the heat rejection apparatus includes a thermal storage apparatus, such as an ice or chilled water storage system. The processor is configured to cause the thermal storage apparatus to charge or store energy and discharge the stored energy to cool the process fluid. The thermal storage apparatus may be charged when the cost of energy is low and may be discharged and used to cool the process fluid when the cost of energy is high (during peak energy usage hours). The processor circuitry, as part of determining the optimal operating parameter of the cooling system to satisfy a target optimization criterion, may determine one or more optimal operating parameters for operation of the thermal storage apparatus.

The present disclosure also provides a heat rejection apparatus for a cooling system. The heat rejection apparatus includes a cooling tower having an evaporative heat exchanger operable to cool process fluid. The heat rejection apparatus includes a sensor configured to detect a variable of the cooling tower and a controller operably coupled to the sensor. The controller is configured to implement an optimal operating parameter for the cooling tower to satisfy a target optimization criterion. The optimal operating parameter may include an operating mode of the cooling tower, fan speed, leaving process fluid temperature, leaving process fluid pressure, and/or evaporative liquid distribution rate as some examples.

The optimal operating parameter is determined at least in part by providing the variable detected by the sensor and a plurality of potential operating parameters of the cooling tower to a machine learning model representative of the cooling tower to estimate power consumption and water usage for the potential operating parameters. In this manner, the cooling tower may thereby be more efficient in operation because the optimal operating parameter implemented by the controller has been determined by estimating power consumption and water usage for a plurality of potential operating parameters rather than following fixed rules.

The present disclosure also provides a method for operating a cooling system. The method includes, at a processor associated with the cooling system, receiving a variable of a cooling system detected by a sensor of the cooling system. The method includes providing the variable and a plurality of potential operating parameters of the cooling system to a machine learning model representative of the cooling system to estimate at least one of energy consumption, water usage, and chemical usage for the potential operating parameters. The method includes determining, based at least in part on the estimated at least one of energy consumption, water usage, and chemical usage for the potential operating parameters, an optimal operating parameter of the cooling system to satisfy a target optimization criterion. The method further includes effecting utilization of the optimal operating parameter by the cooling system. In one embodiment, the processor is a component of a master controller of a building HVAC or industrial system. In another embodiment, the processor is a component of a cloud-based computing system and effecting utilization of the optimal operating parameter by the cooling system includes communicating the optimal operating parameter to the cooling system via a network such as the internet.

Regarding FIG. 1A, a cooling system 10 is provided that is part of an HVAC system of a building. The cooling system 10 includes one or more air handling units 12 positioned in the building and at least one cooling subsystem 14 that includes a cooling tower 16 which rejects heat to the environment, a chiller 18, and a pump 20 configured to circulate process fluid between the cooling tower 16 and the chiller 18. The cooling subsystem 14 is itself a cooling system but is referred to as a subsystem with respect to the description of FIG. 1A because the cooling system 14 is a component of the overall cooling system 10.

In one embodiment, the cooling system 10 further includes a pump 23 operable to pump a process fluid, such as water or a water/glycol, between the chiller 18 and the air handling unit 12. The cooling system 10 may have various configurations, such as including one or more bypass valves, a water source heat pump instead of the chiller 18, and various types of condensers or fluid cooling devices. The cooling system 10 may also include other devices such as an intermediate heat exchanger between a chiller and cooling tower, between a chiller and air handling unit, and/or between a cooling tower and an air handling unit. As a further example, in a refrigeration system, the process fluid may be ammonia and the cooling tower may be an air cooled, adiabatic, hybrid or evaporative condenser that condenses the ammonia from a gas to a liquid. The process fluid flows or is pumped to cool the process or building where the process fluid evaporates before being directed to the chiller 18 and the tower.

In one embodiment, the cooling tower 16 includes an airflow generator such as a fan assembly 21 including a fan 22 a motor 24, a fluid distribution system 26, and a heat exchange element 28, such as one or more direct or indirect heat exchangers. As one example, the cooling tower 16 may utilize water as a heat rejection liquid and the evaporative fluid distribution system 26 sprays the water onto the direct heat exchanger, which typically includes fill, airflow generated by the fan 22 cools the water, and the cooled water is collected in a sump 30.

In another embodiment, the cooling tower 16 may utilize a process fluid that travels through indirect heat exchangers or coils of the heat exchange element 28 and the fluid distribution system 26 sprays a heat rejection liquid, such as water, onto the coils to indirectly cool the process fluid within the coils. The sprayed water is collected in the sump 30 and pumped back to the fluid distribution system 26. The cooling subsystem 14 includes a makeup water supply that provides makeup water into the sump 30 to compensate for water lost to evaporation as an example.

Figure 1B:
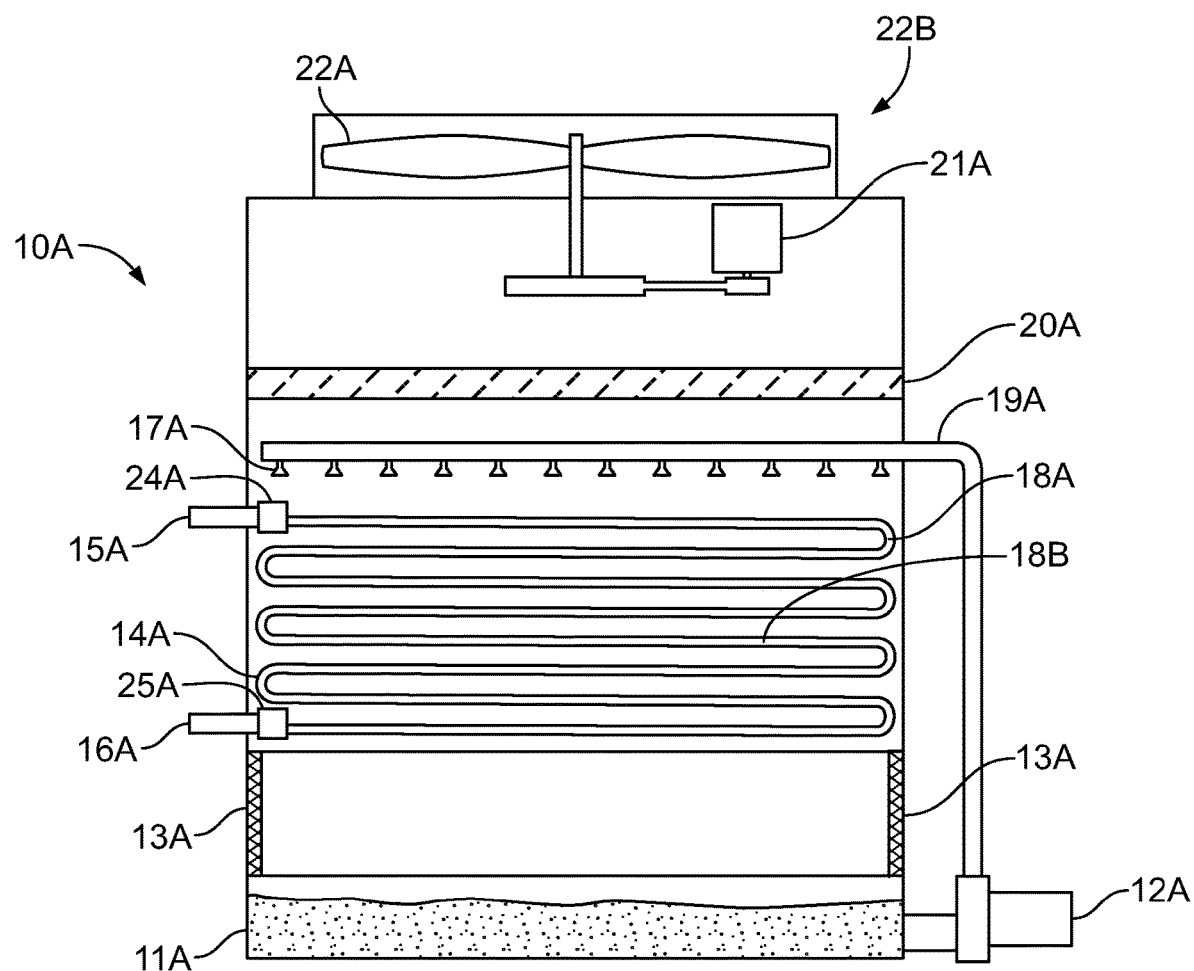
FIG. 1B is a schematic view of an alternative cooling tower including an indirect heat exchanger having a series of serpentine tube runs.

For example and with reference to FIG. 1B, a cooling tower 10A is provided that may operate wet in a wet or evaporative mode, partially wet in a hybrid mode, or can operate in a dry mode, with the spray pump 12A turned off when ambient conditions or lower loads permit. In some embodiments, the cooling tower may additionally or alternatively operate in an adiabatic mode, where the air is adiabatically cooled by a process that evaporates water and changes the air from a dry bulb temperature to a value closer to the wet bulb temperature while the heat exchanger itself operates without evaporation.

The dry, wet, hybrid, and adiabatic modes of operation of a cooling tower reflect the operating characteristics of the cooling tower. In a dry mode, a cooling tower may have an indirect heat exchanger with a sensible-only heat transfer to the air and without spray water on air-facing indirect heat exchanger surfaces. In a wet mode, a cooling tower may have a fully-wetted direct or indirect heat exchanger with direct water-to-air latent and sensible heat rejection on external direct/indirect heat exchanger surfaces. In a hybrid mode, a cooling tower may have a combination of wet and dry heat exchangers in a single package (e.g., series and/or parallel), to allow for better control over the water and energy consumption of the cooling tower. In an adiabatic mode, a cooling tower may have two heat exchangers in series: typically a direct heat exchanger with water-to-air-contact to pre-cool the air prior to the air entering a dry heat exchanger section. The cooling tower in the adiabatic mode may have the ability to control energy and water usage by turning a water supply on/off.

Spray pump 12A receives the coldest cooled evaporatively sprayed fluid, usually water, from cold water sump 11A and pumps the water to primary spray water header 19A where the water comes out of nozzles or orifices 17A to distribute water over indirect heat exchanger 14A. Spray water header 19A and nozzles 17A serve to evenly distribute the water over the top of the indirect heat exchanger 14A. As the coldest water is distributed over the top of indirect heat exchanger 14A, a motor 21A of a fan assembly 22B spins a fan 22A of the fan assembly 22B which induces or pulls ambient air in through inlet louvers 13A, up through indirect heat exchanger 14A, then through a drift eliminator 20A which serves to prevent drift from leaving the unit, and then the warmed air is blown to the environment. The air generally flows in a counterflow direction to the falling spray water. Although FIG. 1B is shown with axial fan 22 inducing or pulling air through the unit, the fan system may be any style fan system that moves air through the unit including but not limited to induced and forced draft in a generally counterflow, crossflow or parallel flow with respect to the spray. The motor 21A may be a variable speed motor capable of rotating the fan 22 at varying speeds. Additionally, motor 21A may be belt drive as shown, gear drive or directly connected to the fan. Indirect heat exchanger 14A is shown with an inlet connection pipe 15A connected to inlet header 24A and outlet connection pipe 16A connected to outlet header 25A. The inlet connection pipe 15A may receive process fluid such as water from a chiller, such as chiller 18, and outlet connection pipe 16A may direct the water to a pump such as pump 20 (see FIG. 1A). The relative position of the inlet header 24A and the outlet header 25A may be swapped or otherwise configured depending on the particular process fluid and the particular installation. The inlet header 24A connects to the inlet of multiple serpentine tube circuits of the indirect heat exchanger 14A while outlet header 25A connects to the outlet of the multiple serpentine tube circuits. Serpentine tube runs 18B are connected with return bend sections 18A. Return bend sections 18A may be continuously formed with the circuit serpentine tube runs 18B or may be welded between runs 18B.

Regarding FIG. 1A, the pump 20 directs cooled water from the cooling tower 16 along a cool process line 32 to a water cooled condenser 34 of the chiller 18 wherein the water receives heat from the chiller 18. The water then travels along a hot process fluid line 36 back to the cooling tower 16, such as to the fluid distribution system 26. In one embodiment, the chiller 18 includes an evaporator 40, compressor 42, and an expansion valve 45 that operate with the condenser 34 to remove heat from a chilled water supply 44 from a heat exchanger 46 of the air handling unit 12. The pump 23 pumps water from the chiller 18 along a chilled water fluid return line 48 that goes to the heat exchanger 46 of the air handling unit 12.

The cooling system 10 may be part of an HVAC system for a building that is controlled by a master controller 50. The master controller 50 may connect to or be part of the building automation system, building management system, other building or process system, or industrial process. The master controller 50 may control operation of the cooling system 10 as well as a heating system. The cooling system 10 includes a cooling subsystem controller 52 operably coupled to cooling subsystem 14 and configured to control the operation of at least one of the pump 20, cooling tower 16, and chiller 18. The cooling subsystem controller 52 is operably coupled to the master controller 50 and may operate the cooling subsystem 14 according to instructions from the master controller 50. The cooling subsystem controller 52 has a memory 60, a processor 62, and communication circuitry 64. The communication circuitry 64 may communicate via wired and/or wireless approaches with the master controller 50, a server computer 54, and/or a user device 58. The cooling subsystem controller 52 may communicate with the master controller, server computer 54, and/or user device 58 via one or more networks 56. The networks 56 may be interconnected or may be separate as some examples. Example networks 56 include a local Wi-Fi network, a cellular network, and the internet as some examples. The user device 58 may be, for example, a smartphone, smartwatch, personal computer, laptop computer, in-vehicle display. The user device 58 includes a user interface 59 that permits a user to monitor and/or adjust the operation of the cooling subsystem 14. The user interface 59 may include, for example, at least one of a screen, a touchscreen, a microphone, a speaker, a haptic feedback generator, a hologram, an augmented reality display.

In some embodiments, the cooling system 10 may include multiple pumps 20, cooling towers 16, and/or chillers 18. For example, the cooling system 10 may include two or more cooling towers 16 acting in parallel, such that each of the cooling towers 16 receive process fluid from the chiller 18 and return the process fluid to the chiller 18. In another example the cooling towers 16 act in series, such that a first cooling tower 16 receives process fluid from the chiller 18, then the process fluid flows exits the first cooling tower 16 and flows to at least one other cooling tower 16, before returning to the chiller 18. In some embodiments, the cooling system 10 includes multiple cooling towers 16 acting both in series and in parallel with one another. These cooling towers 16 may be dry cooling towers, wet cooling towers, configured to switch between a wet mode of operation and a dry mode of operation, or a combination of multiple types of cooling towers 16. The cooling system 10 may include multiple chillers 18 within the building that provide process fluid to the one or more cooling towers 16 of the cooling system 10 for cooling. The master controller 50, cooling subsystem controller 52, and/or server computer 54 may be configured to control the operation of the cooling system 10 and its components.

In some embodiments, the cooling system 10 further includes a thermal storage system. The thermal storage system may include a storage medium that is cooled to store energy for use by the cooling system 10 at a later time. Example of a thermal storage system include an ice thermal storage system and a chilled water thermal storage system. As an example, the ice thermal storage system may create ice to store energy, and then melt the ice to aid the cooling system 10 in cooling at a later time. For instance, the ice thermal storage system may aid the cooling tower 16 in cooling the process fluid from the chiller 18 so that the cooling tower 16 reduces its energy consumption. The thermal storage systems may be operated in a partial thermal storage mode where the thermal storage system aids the cooling tower 16 in cooling the process fluid from the chiller 18 or in a full thermal storage mode where the cooling tower 16 is not operating and the thermal storage system is providing all of the cooling. The thermal storage system may operate to store energy (e.g., create ice) when energy costs are low or during off-peak hours and then discharge the energy (e.g., melt the ice) when energy costs are high or during peak hours. Thus, the cost of running the cooling system 10 may be further minimized by using thermal storage systems.

Regarding FIG. 1A, the cooling subsystem controller 52 may communicate information regarding the cooling subsystem 14 with the master controller 50. As discussed in greater detail below, the cooling subsystem controller 52 may analyze current environmental and operating conditions of the cooling subsystem 14 and/or predict future environmental and operating conditions of the cooling subsystem 14 to provide one or more recommended parameters to the master controller 50. The master controller 50 may direct the cooling subsystem controller 52 to control the cooling subsystem 14 based at least in part on the recommended parameters from the cooling subsystem controller 52. In another embodiment, the cooling subsystem controller 52 implements the recommended parameters independently of the master controller 50.

The server computer 54 includes a processor 70, communication circuitry 72, and an electronic storage or memory 74. The server computer 54 includes hardware, software, and/or firmware that operate to provide the operability described herein. The processor 70 may include at least one of a digital processor, a digital circuit designed to process information, and software. The processor 70 may include a single processor or a plurality of processors. The processors may be within the same or different computers, such as a cloud of server computers. The memory 74 may include, for example, optical storage, magnetically readable storage media, random access memory, and/or other electronic storage media.

As an example, the cooling subsystem controller 52 communicates data from one or more sensors of the cooling subsystem 14 to the server computer 54 and the processor 70 develops one or more machine learning models 151 (see FIG. 3B) representing relationships between variables of the environment and the cooling subsystem 14. The machine learning models permit potential operating parameters for the cooling subsystem 14 to be inputted into the models to obtain estimated energy, chemical, and and/or water usage by the cooling subsystem 14. The server computer 54 may receive data from cooling subsystems 14 at different facilities to produce more accurate machine learning algorithms. The machine learning models may be stored in the memory 74 and/or the memory 60 and may be utilized by the processor 70 and/or the processor 62. As another example, the cooling subsystem controller 52 and/or the master controller 50 may develop the one or more machine learning models 151.

In one embodiment, the processor 70 utilizes reinforcement learning and self-tuning to modify the one or more machine learning models 151 over time and make the machine learning models 151 more accurate as more historical data is collected from the cooling subsystem 14 and from cooling subsystems in other installations. The processor 70 may adjust data aggregation rate, optimization frequency, and/or model hyperparameters as some factors that may be adjusted. The ability of the processor 70 to modify the one or more machine learning models 151 over time increases the autonomy and agnostic capability of the machine learning models 151. The reinforcement learning may include comparing predicted variables with measured variables and making reward and/or action decisions based on the differences between the predicted and measured variables. The processor 70 may automatically self-tune the one or more machine learning models 151 at fixed or variable intervals, such as hourly, daily, weekly, etc. The processor 70 may self-tune the one or more machine learning models 151 in response to an event, such as a request from a user or a measured parameter exceeding a threshold as some examples. The self-tuning may involve determining, for example, which coefficients to use and/or which sensor data should be used as inputs to the one or more machine learning models 151. The processor 70 may also determine which machine learning models 151 to use, such as initially using several machine learning models 151 and subsequently using only the machine learning model(s) 151 that are computationally most efficient once a sufficient amount of historical data has been aggregated for the cooling subsystem 14. As another example, the cooling subsystem controller 52 and/or the master controller 50 may self-tune the one or more machine learning models 151.

Figure 2:
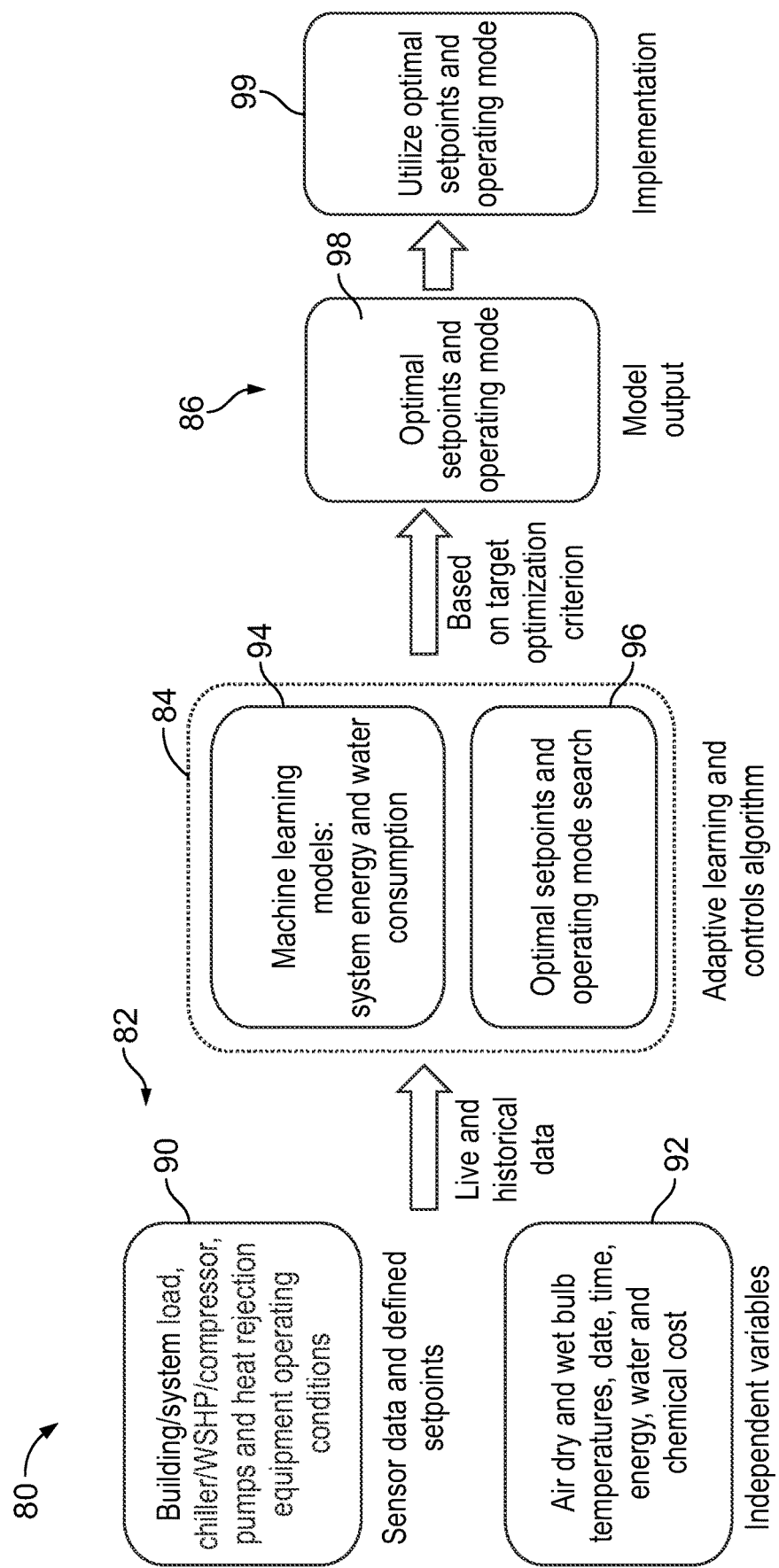
FIG. 2 is a flow diagram of a method that includes determining one or more optimal set points of the cooling subsystem of FIG. 1 and an operating mode of the cooling tower utilizing machine learning models that represent the cooling subsystem.

Regarding FIG. 2, in one embodiment, the master controller 50, the cooling subsystem controller 52, and/or the server computer 54 perform a method 80 that includes determining 86 one or more optimal control settings or operating parameters, such as one or more set points and a cooling tower operating mode, to achieve a particular target optimization criterion of the cooling subsystem 14. The target optimization criterion of the cooling subsystem 14 may include, for example, minimizing energy consumption, minimizing water consumption, minimizing chemical water treatment, and/or minimizing operating costs and maintenance of the cooling subsystem 14. Another target optimization criterion is minimizing $CO_2$/greenhouse gas emissions which may be dependent on the amount of energy consumed and the source (e.g., natural gas, hydroelectric, wind, etc.) providing the energy. The method 80 provides a recommended optimal control action and based on the current state of the cooling subsystem 14 and may implement the recommended optimal control action to optimize operation of the cooling subsystem 14.

The method 80 recognizes that the operation of each of the components of the cooling subsystem 14 impacts the other components. The method 80 provides a holistic approach to providing the desired operation of the cooling subsystem 14 by developing machine learning models of the cooling subsystem 14 that recognize the interdependence of the components of the cooling subsystem 14. In one approach, the machine learning models utilize input variables that have been determined to be important for accurately estimating the operation of the cooling subsystem 14 such as the variables shown in FIG. 3A.

Regarding FIG. 2, the method 80 includes aggregating 82 data from sensors of the cooling subsystem 14 and providing 84 a plurality of potential operating parameters of the cooling subsystem 14 to at least one machine learning algorithm for estimating energy and water consumption based on the provided potential parameters. The method 80 further includes determining 86 a recommended or optimal operating parameter of the cooling system 10 based at least in part upon the estimated energy and water consumption. The optimal parameter may include one or more optimal setpoints and/or an optimal operating mode of one or more components of the cooling system 10. The optimal parameter may include turning one or more components of the cooling system 10 on or off. The optimal parameter of the cooling system may be a parameter that achieves the target optimization criterion of the cooling subsystem 14 such as minimizing energy consumption, minimizing water consumption, minimizing water treatment chemical consumption, or minimizing operating cost.

The aggregating 82 data from sensors of the cooling subsystem 14 includes aggregating variables of the cooling subsystem 14 such as collecting 90 sensor data and set points for the cooling subsystem 14. The sensor data and set points may include, for example, one or more variables representative of a cooling load (such as building load), chiller, water-source heat pump (WSHP), compressor, pumps, and heat rejection equipment. The sensor data may also include one or more malfunctions detected by one or more sensors of the cooling subsystem 14. The aggregating 82 further includes collecting 92 sensor data for one or more environmental variables. The environmental variables may include, for example, air dry bulb temperature, relative humidity, wet bulb temperature, date, time, utility cost (e.g., electricity and water), and/or cost of water treatment chemicals used in the cooling subsystem 14.

The providing 84 operation may include providing 94 the cooling subsystem variables and the environmental variables to one or more machine learning models of the cooling subsystem 14. The one or more machine learning models may include, for example, machine learning models utilizing weighted k-nearest neighbor regression (w-k-NN), decision tree regression (DT), and/or neural network regression (NN). The machine learning models may be updated in real-time. The update frequency, data aggregation period, and optimization frequency may be fixed or variable.

The aggregating 82 and/or providing 84 may include processing the aggregated data for use in the one or more machine learning models. The processing may include data cleaning and normalization such as addressing outliers, addressing missing data, and resolving time stamp issues. The processing may make the aggregated data functionable or actionable. For example, a sensor sampling rate may be one second, the data aggregation operation may have a 15 minute duration, and the processing may include averaging the data collected over the 15 minute time period.

The cooling subsystem controller 52 may be preloaded with one or more default machine learning models for the cooling subsystem 14 for selection by an installer during installation of the cooling subsystem 14. The preloaded machine learning models provide a rough model of the cooling subsystem 14. For example, the installer may provide the make and model of the cooling tower 16, pump 20, and chiller 18 to the cooling subsystem controller 52 and the processor 62 retrieves energy and water consumption machine learning models from the memory 60 for the specified cooling subsystem 14. The one or more preloaded machine learning models may be refined over time utilizing the measured environmental and operational variables and corresponding behavior of the cooling subsystem 14 including energy and water consumption. In another approach, the preloaded machine learning models are no longer used once individualized models have been developed for the cooling subsystem 14 using historical data that satisfy an accuracy threshold.

The cooling subsystem controller 52 may be configured to detect actual and/or estimated anomalies in the operation of the cooling subsystem 14. The cooling subsystem controller 52 may compare actual operating data and/or estimated operating data to historical data. The cooling subsystem controller 52 may send an alert to the master controller 50, server computer 54, and/or user device 58 upon detecting the anomaly. The cooling subsystem controller 52 may send the alert if the magnitude of the anomaly, such as a temperature of a fluid or a component, is beyond a maximum threshold. The maximum threshold may be, for example, set by a user, by a manufacturer, or based on the output of at least one separate machine learning model such as a clustering algorithm. As another example, the cooling subsystem controller 52 may send the alert if a number of anomalies occur within a given time period. The alert may include an email, an application notification, a telephone call for service, and/or a SMS message as some examples. Alternatively or additionally, the cooling subsystem controller 52 may adjust one or more components of the cooling subsystem 14 to address the anomaly.

The providing 84 includes utilizing 96 the one or more machine learning models to estimate the operation of the cooling subsystem 14, such as energy and/or water consumption, for the cooling subsystem 14 based on a plurality of potential parameters for the cooling subsystem 14. The potential parameters provided to the one or more machine learning models each include a minimum and a maximum value that correspond to the actual minimum and maximum values permitted by the cooling subsystem 14. In this manner, the one or more machine learning models are limited to providing potential parameters that are actionable by the cooling subsystem 14 or are within the operating constraints of the cooling subsystem 14 and/or cooling system 10.

The determining 86 may include providing 98 at least one optimal operating parameter of the cooling subsystem 14, such as set points and/or an operating mode of one or more components of the cooling subsystem 14, according to the target optimization criterion. In one form, determining 86 includes selecting at least one optimal operating parameter of the cooling subsystem 14 from one or more optimal operating parameters of the cooling subsystem 14 the machine learning model predicts would meet the cooling demands of the cooling subsystem 14. The selection may include selecting at least one optimal operating parameter based on the target optimization criterion. The cooling subsystem controller 52 may then implement 99 the optimal parameter(s). The implementing 99 may involve adjusting one or more of the components of the cooling subsystem 14 to operate according to the provided optimal parameter.

Figure 3A:
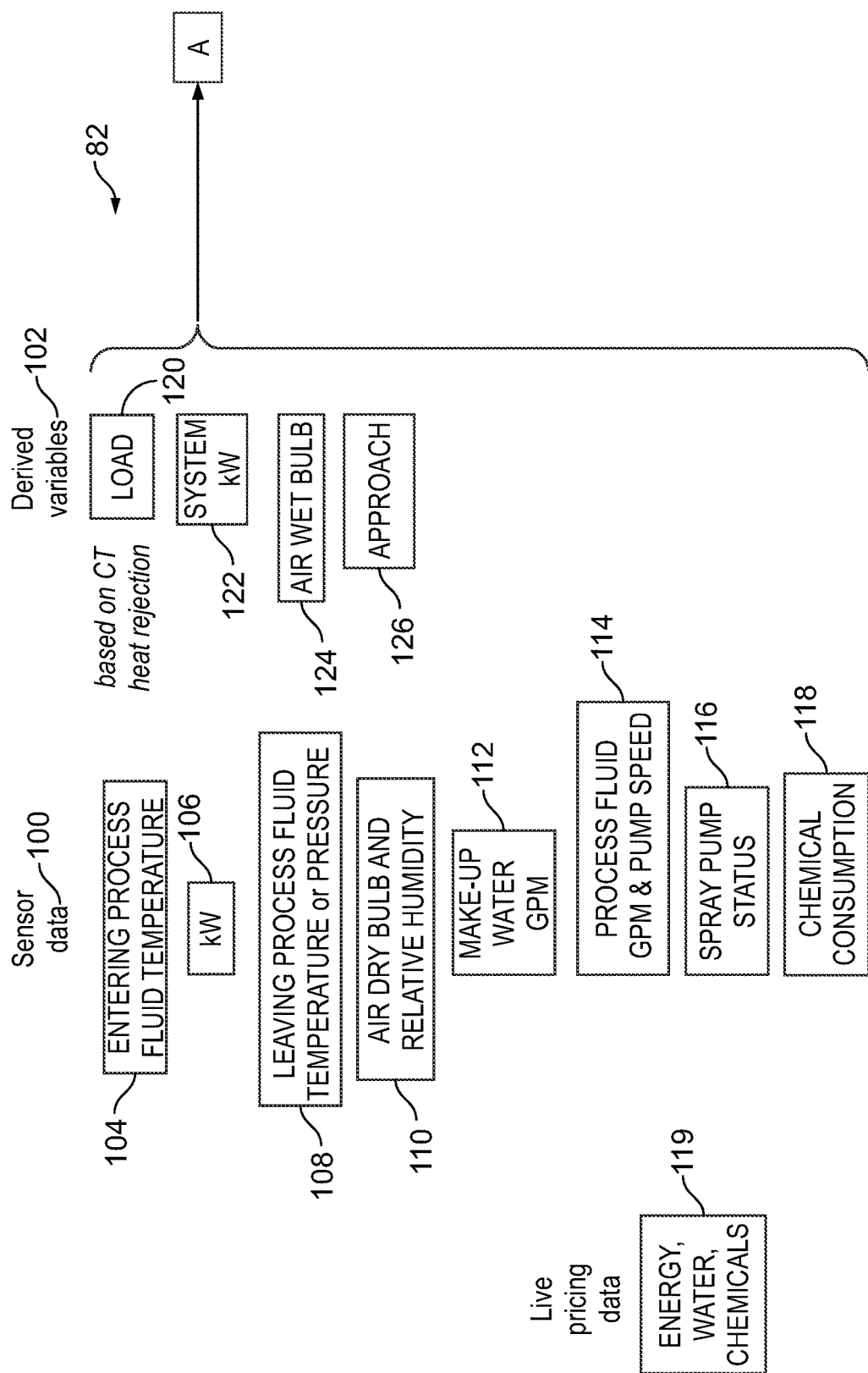
FIGS. 3A and 3B are a flow diagram of aspects of the method of FIG. 2 showing aggregating sensor data and utilizing machine learning models representing the cooling subsystem to determine the one or more optimal set points and the operating mode.
Figure 3B:
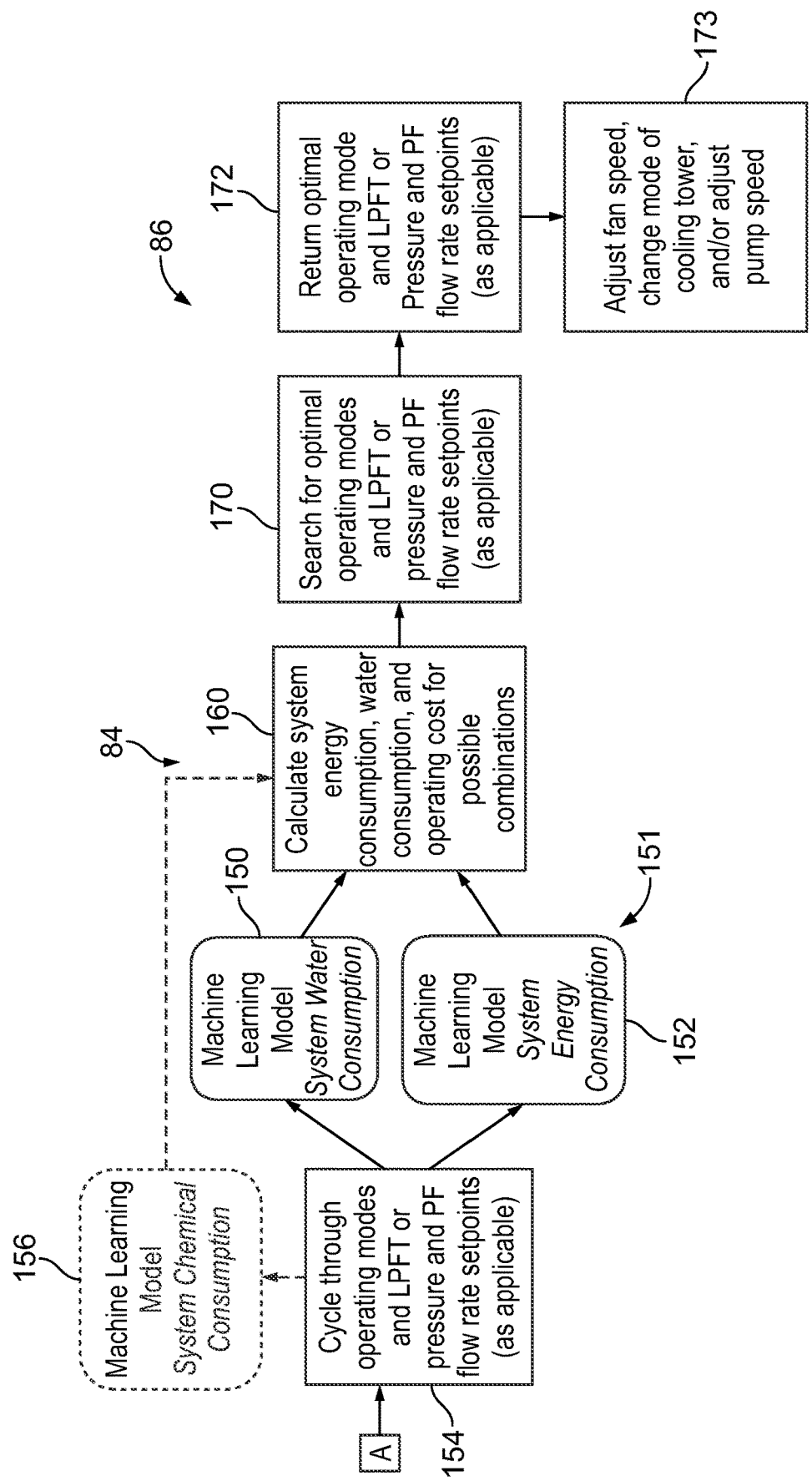

Regarding FIGS. 3A and 3B, further details of the method 80 are provided. In one form, the aggregating 82 includes collecting 100 sensor data indicative of variables, such as one or more environmental variables and one or more operating variables of the cooling subsystem 14. The environmental variables may include, for example, air dry bulb (DB), atmospheric pressure, and relative humidity (RH) variables 110, such as gathered by a temperature sensor 77 (see FIG. 1A) and a humidity sensor 79 of the cooling tower 16. The aggregating may include identifying at least one time-related variable such as time of day, date, month, and season.

The sensor data for operating variables of the cooling subsystem 14 may include an entering process fluid temperature (EPFT) variable 104 that may be gathered by one or more sensors on the hot process fluid line 36, such as one or more thermistors 36A. The sensor data may further include an energy consumption variable 106 for each of the individual components of the cooling subsystem 14, such as a chiller, a water-source heat pump, a compressor, a condenser water pump, and a cooling tower. For a cooling tower, the energy consumption variable 160 may include energy consumption of one or more fans of the cooling tower and, in some embodiments, the energy consumption of a spray water pump. The energy consumption variable 106 may be directly measured from each component by one or more sensors measuring the current and/or voltage used by the component. The energy consumption variable 106 may be measured in kilowatts (kW) for example. The sensor data may further include a leaving process fluid variable 108, such as temperature and/or pressure collected using sensor(s) such as one or more thermistors 32A and/or a pressure sensor 32B of the cool process fluid line 32. The sensor data may also include a makeup water flow rate variable 112, which may be detected using a flow meter monitoring a flow rate of makeup water plumbed into the sump 30. The flow rate may be an instantaneous flow rate measurement or a totalizing meter output water consumption over time as some examples. The makeup water flow rate variable 112 may include a blowdown flow rate which may be measured or calculated in some applications.

The sensor data for operating variables of the cooling subsystem 14 may include a process fluid pump variable 114, such as the process fluid flow rate generated by the pump 20 (e.g. gallons per minute (GPM)) and the speed of the pump 20. In one embodiment, the pump 20 has an adjustable flow rate. For example, the pump 20 may have a variable frequency drive and the speed of the pump 20 may be determined by measuring the electrical power frequency of the pump 20. In other applications, the speed of the pump 20 is fixed and the process fluid flow rate may be a constant value. As another example, the cooling subsystem 14 does not include the pump 20 and the process fluid pump variable 114 is not utilized. Instead, a refrigerant mass flow rate may be utilized that is either measured or calculated from a compressor speed, compressor energy consumption, condensing temperature, and/or condensing pressure.

The sensor data may further include a fluid distribution system variable 116, such as a status (on, off, speed, and/or pressure) and/or flow rate of a spray pump of the fluid distribution system 26. The sensor data may further include a chemical consumption variable 118, such as a gram per hour indication of the chemical(s) being added to makeup water provided to the cooling subsystem 14. Chemicals typically utilized in cooling systems include corrosion inhibitors (for example bicarbonates) to neutralize acidity and protect metal components, algaecides and biocides (for example bromine, chlorine, ozone, hydrogen peroxide, bleach) to reduce the growth of microbes and biofilms. In addition, scale inhibitors (for example phosphoric acid) may be added to prevent contaminants from forming scale deposits. The chemical consumption variable 118 may be determined, for example, by a scale weighing a container(s) containing the chemical(s) that are added to the circulating process fluid of the cooling subsystem 14. The aggregating 82 may also include receiving pricing data 119 for energy, water, and/or chemicals. The pricing data 119 may be current "live" pricing data that fluctuates or may be a set value if the current pricing data is not available.

The sensor data may further include a component malfunction variable, such as a status (fully operational, limited capacity, or not-functioning) of one or more components of the cooling subsystem 14. For example, one or more sensors of the system 10 may detect whether one or more components of the cooling subsystem 14 are no longer functioning or in an error state such that they are not be able to be operated by the cooling subsystem controller 52. A component may be no longer functioning when the component breaks or is in need of service or repair. A component may also be considered not-functioning when the component enters an error state. The component may enter an error state upon detecting certain conditions are present prohibiting operation of the component. For example, if the fan 22 of the cooling tower 16 exceeds a predetermined temperature, the sensor may determine that the fan 22 is in an error state and cannot be operated until the temperature of the fan 22 decreases below the predetermined temperature. A component may be determined to have limited capacity when certain conditions are present. For example, if the fan 22 of the cooling tower 16 is approaching a certain temperature, the fan 22 may be configured not be able to be operated above a certain speed. As another example, a component may be given a runtime limit. For instance, the fan 22 may be set to not operate above a set speed for more than 10 hours a day to increase the lifespan of the fan 22. When the fan 22 is approaching or has met the runtime limit, the sensor data may indicate the fan 22 has a limited capacity, i.e., may not be operated above the set speed. The component malfunction variable may be used to determine the potential operating parameters that the cooling subsystem 14 may be operated at to provide to the machine learning models, as discussed below.

As noted above, the aggregating 82 includes deriving 102 variables from one or more of the sensor data collected at operation 100. For example, a cooling load 120 may be derived from the entering process fluid temperature variable 104, the leaving process fluid variable 108, and the process fluid pump variable 114. The derived 102 parameters may further include a system energy consumption variable 122 that may be a sum of the energy consumption variables 106 for all the components of the cooling subsystem 14. The derived 102 variables may include air wet bulb (WB) temperature 124 that may be directly measured or may be derived from the air dry bulb, atmospheric pressure, and relative humidity variables 110. The relative humidity variable may be replaced with a direct wet bulb measurement. The derived 102 variables may further include an approach variable 126, which is the difference between the leaving process fluid and entering wet bulb temperatures.

Referring to FIG. 3B, in one embodiment the one or more machine learning models 151 representing the cooling subsystem 14 include machine learning models for system water consumption 150 and system energy consumption 152. Providing 84 includes providing a plurality of potential parameters, such as a range of potential parameters, to the machine learning models for system water consumption 150 and system energy consumption 152. In one embodiment, the providing 84 includes cycling 154 through potential parameters including operating modes (wet, dry, hybrid or adiabatic) of the cooling tower 16, values for the leaving process fluid temperature (LPFT) and/or pressure, and the process fluid flow rate to calculate 160 system energy, water consumption, and operating cost for possible combinations of potential parameters such as every possible combination of potential parameters. Where the cooling system 10 includes multiple cooling towers 16, providing 84 may include cycling 154 through potential parameters including an operating status or mode (e.g., on, off, wet, dry, adiabatic, etc.) for each cooling tower 16 and/or potential configurations (e.g., series, parallel, or a combination thereof). Where the cooling system 10 includes a thermal storage system, providing 84 may include cycling 154 through potential operating modes of the thermal storage system.

The potential parameters used in the cycling 154 operation reflect the capabilities of the cooling subsystem 14. For example, the possible operating modes of the cooling tower 16 may be limited by the operating modes permitted by the cooling tower 16. As another example, some cooling towers 16 may only be capable of dry operation whereas other cooling towers 16 are capable of dry or wet operation, whereas still other cooling towers 16 are capable of dry, wet, hybrid, or adiabatic operation. Further, the leaving process fluid temperature from the cooling tower 16 may be limited by the maximum or minimum return temperature permitted by the chiller 18 and the process fluid flow rate may be limited by the minimum and maximum flow rate of the cooling tower 16. As another example, the potential parameters may be limited to the components of the cooling subsystem 14 that are currently operational and not malfunctioning. For instance, if the fan 22 of the cooling tower 16 is malfunctioning, the potential parameters will reflect that the fan 22 cannot be operated. The method 80 may include determining the maximum and minimum values of the potential parameters that may be utilized in the cycling 154 operation, as discussed in greater detail below with respect to FIGS. 4-7.

In one embodiment, the one or more machine learning models 151 also include a chemical consumption machine learning model 156. The chemical consumption machine learning model 156 may directly estimate chemical usage by way of a sensor associated with the chemicals, such as a digital scale. In another approach, the chemical consumption machine learning model 156 indirectly estimates chemical consumption by utilizing the water consumption predicted by the machine learning model for system water consumption 150 and an estimated chemical consumption rate (e.g. kilograms per gallon water).

The machine learning models for the system water consumption 150, system energy consumption 152, and chemical consumption 156 may each include one or more machine learning models that may utilize different types of modeling algorithms. For example, the system water consumption 150, system energy consumption 152, and chemical consumption 156 machine learning models may each utilize a weighted k-nearest neighbor regression (w-k-NN) as shown in FIG. 8 and/or a neural network regression (NN) as shown in FIG. 9 and discussed in greater detail below. For situations where there is limited historical data, such as shortly after installation or repair of a component of the cooling subsystem 14, the cooling subsystem controller 52 may utilize manufacturer default data for one or more of the components of the cooling subsystem 14 to provide a rough guide for the machine learning models 151 as they estimate the operation of the cooling subsystem 14. The manufacturer default data may also be used with the machine learning models 151 if the model prediction confidence is low or to make sure that the system is operating as the manufacturer expects. The machine learning models for the system water consumption 150, system energy consumption 152, and chemical consumption 156 may be, for example, cooling subsystem-level models and/or discrete models for each piece of equipment of the cooling subsystem 14.

The providing 84 includes calculating 160 system energy and water consumption and operating cost for the plurality of potential cooling subsystem parameters provided to the machine learning models for system water consumption 150, system energy consumption 152, and system chemical consumption 156. The calculated water consumption may not include blowdown and the cycles of concentration (CoC) calculation may be used for total water usage estimation.

Regarding FIG. 3B, the determining 86 may include searching 170 for an optimal operating mode of the cooling tower 16 and optimal set points for the temperature of the process fluid temperature leaving the cooling tower 16, the pressure of the process fluid leaving the cooling tower 16, and/or the flow rate of the process fluid. Searching 170 may further include searching for the optimal combination of cooling towers 16 to be turned on/off, or operated in series/parallel/combination configurations, where the cooling system 10 includes more than one cooling tower 16. The searching 170 conditions the searching based on a desired or target optimization criterion for the cooling subsystem 14, such as minimizing energy consumption, minimizing water consumption, minimizing water treatment chemicals, or minimizing operating costs. The different optimization criteria may provide different results for a given operating condition of the cooling subsystem 14. For example, in geographical locations where water is scarce, minimizing operating costs for the cooling subsystem 14 may involve decreasing water consumption for a given environmental and building load situation whereas more water may be utilized in a geographical area where water is more plentiful for the same environmental and building load situation. As another example, minimizing operating costs for the cooling subsystem 14 may result in a higher energy consumption of the components of the cooling subsystem 14 during an earlier time of day when energy is cheaper and less energy consumption later in the day when energy is more expensive.

As another example, the master controller 50, cooling subsystem controller 52, and/or server computer 54 may select an optimization criterion according to an event such as a user input, such as from the user device 58, or a demand response for energy consumption and water consumption. Examples in this regard include adjusting energy consumption to correspond to the available supply of a renewable energy source (e.g., solar power) and adjusting water consumption during a drought. In one embodiment, the master controller 50 may receive a communication from a utility provider indicative of available power and/or water. The communication may cause the master controller 50 to temporarily override optimization criterion for the cooling subsystem controller 52 provided by a user or the master controller 50.

As another example, the target optimization criterion may be scheduled for certain times and may change based on the time of day, the day of the week, or the month. As one example, the target optimization criterion may be scheduled to minimize energy consumption during peak energy usage hours but may switch to minimize water usage during the nighttime.

Another example of the target optimization criterion changing in response to an event is the master controller 50, cooling subsystem controller 52, and/or server computer 54 changing from a target optimization criterion of minimizing water consumption to a target optimization criterion of minimizing energy consumption upon the cooling subsystem 14 consuming a day's allotment of water. Once the day's allotment of water has been consumed, the cooling tower of the cooling subsystem may have to operate in a dry mode. The target optimization criterion may remain as minimizing energy consumption until the next day when the target optimization criterion resets to minimize water consumption. As another example, the event that triggers a change in the target optimization criterion may be a determination by a resource conservation algorithm that the target optimization criterion should be changed to conserve limited resources (e.g., water and/or electricity from a renewable energy source). The resource conservation algorithm may utilize a rank-based voting method to decide how to utilize limited resources based on historical, current, and predicted future environmental and load conditions.

Another example where the target optimization criterion changes in response to an event, is where the cooling subsystem 14 is configured to minimize the $CO_2$ or greenhouse gas emissions. The master controller 50, cooling subsystem controller 52, and/or server computer 54 may receive data regarding the amount of $CO_2$/KWh of the electricity currently on the grid. The amount of $CO_2$/KWh may fluctuate daily based on the energy sources providing power to the grid the cooling subsystem 14 draws power from. If the amount of $CO_2$/KWh drops below a predetermined threshold, the system may be configured to switch from minimizing energy consumption to minimize the cost or water consumption. Alternatively, if the amount of $CO_2$/KWh exceeds a certain threshold, the system may be configured to switch to minimize energy consumption to reduce the amount of $CO_2$/greenhouse gases the system effectively emits.

Another example includes switching between different target optimization criterion based on the real-time or current cost of each resource used by the cooling system 10. For example, the master controller 50, cooling subsystem controller 52, and/or server computer 54 may receive data that provides the real-time, scheduled, and/or predicted cost of water and/or energy. The system may take into account peak load shaving incentives provided by a utility with a real-time cost/kW reduction. The cooling subsystem 14 may be configured to minimize the water consumption, unless the cost of energy exceeds a certain predetermined threshold. If the current cost of energy is determined to be greater than the predetermined threshold, the system may then switch to minimize energy consumption. The system may switch to minimize water consumption if the price of energy is determined to drop below the predetermined threshold. Similarly, the system could switch to minimize water consumption when the cost of water is determined to exceed a certain predetermined threshold.

Another example includes switching the target optimization criterion based on boundary parameters set for the equipment of the cooling system 10. If the target optimization criterion necessitates that one or more components of the cooling system 10 operate outside a boundary parameter to meet the cooling load, then the target optimization criterion may be switched to operate within the boundary parameters set for the cooling system 10 and to meet the cooling load. For instance, in some applications a limit may be set on the chiller 18 run speed. As one example, the chiller 18 may be set to operate within a preferred operating range (e.g., between 40% and 85% speed). If the recommended operation parameters of the cooling system 10 require the chiller 18 to operate outside the preferred operating range, the target optimization criterion may be changed to allow the chiller 18 to operate within the preferred operation range. As another example, a pump or a fan of the cooling system 10 may be given a runtime limit or be set not to exceed a runtime at or above a predetermined speed. Thus, if the recommended operating parameters for a certain target optimization criterion require the equipment to operate outside of the runtime limit, the target optimization criterion may be changed to comply with the runtime limit.

As yet another example, the master controller 50, cooling subsystem controller 52, and/or server computer 54 may be configured to switch the target optimization criterion if the chiller 18 is unable to meet its setpoint with the cooling tower 16 operating to meet a certain target optimization criterion. For instance, where the cooling tower 16 is set to minimize water consumption and the chiller 18 is not able to meet its chilled water temperature setpoint while the cooling tower 16 operates to minimize water consumption, the target optimization criterion may be switched to minimize energy consumption or cost to enable the chiller 18 to meet its setpoint.

The minimizing energy consumption and minimizing water consumption target objectives may also yield different results. As an example, minimizing energy consumption may result in the cooling subsystem controller 52 providing 98 an optimal parameter for process fluid flow rate that is higher for a given environmental and building load than the process fluid flow rate provided 98 if the minimizing water consumption target objective were used. Specifically, the cooling subsystem controller 52 may provide a lower optimal parameter for process fluid flow rate but a higher speed for the fan 22 of the cooling tower 16 if the target optimization criterion is to minimize water consumption than if the minimizing energy consumption were used. It will be appreciated that different system operating temperature, air temperature, humidity, and system design may lead to different optimal parameters.

The determining 86 may further include providing or returning 172 one or more optimal parameters of the cooling subsystem 14 to achieve the target optimizing criterion, e.g., minimized energy consumption, minimized water consumption, or minimized operating cost. The one or more optimal parameters may include the optimal operating mode of the cooling tower 16, the temperature of the process fluid leaving the cooling tower 16, the pressure of the process fluid leaving the cooling tower 16, and/or the process fluid flow rate. As an example, the returning 172 may include returning a wet operation of the cooling tower 16 and a particular frequency, or speed, or flow rate for the variable frequency drive of the pump 20.

Regarding FIGS. 2 and 3B, the implementing 99 may include adjusting 173 one or more components of the cooling subsystem 14. For example, if the optimal parameter is a higher or lower leaving process fluid temperature of the cooling tower 16 than currently detected, the adjusting 173 may include increasing the speed of the fan 22 to decrease the leaving process fluid temperature or decreasing the speed of the fan 22 to increase the leaving process fluid temperature. As another example, if the optimal parameter is a higher or lower leaving process fluid pressure of the cooling tower 16 than currently detected, increasing the speed of the fan 22 will decrease the leaving process fluid pressure and decreasing the speed of the fan 22 will increase the leaving process fluid pressure. Alternatively or additionally, the adjusting 173 may include changing the operating mode of the cooling tower 16 to achieve step-changes in leaving process fluid temperature and leaving water pressure of the cooling tower 16. More specifically, if the cooling tower 16 is running in a dry mode at 50% fan speed, switching the cooling tower 16 to wet mode while maintaining the 50% fan speed will cause the leaving process fluid temperature and/or leaving process fluid pressure to drop significantly. The leaving process fluid temperature and leaving process fluid pressure may be further adjusted by increasing or decreasing fan speed in the new operating mode of the cooling tower 16. As yet another example, for a given fan speed and entering process fluid temperature at the cooling tower 16, increasing the speed of the pump 20 to increase the water flow rate will increase leaving process fluid temperature and decreasing the speed of the pump 20 to decrease water flow rate will decrease leaving water temperature. As another example, where the cooling system 10 includes a thermal storage system, the thermal storage system may be switched to a full or partial thermal storage discharge mode to adjust the aid the thermal storage system provides to the cooling tower 16 in cooling the process fluid.

Figure 4:
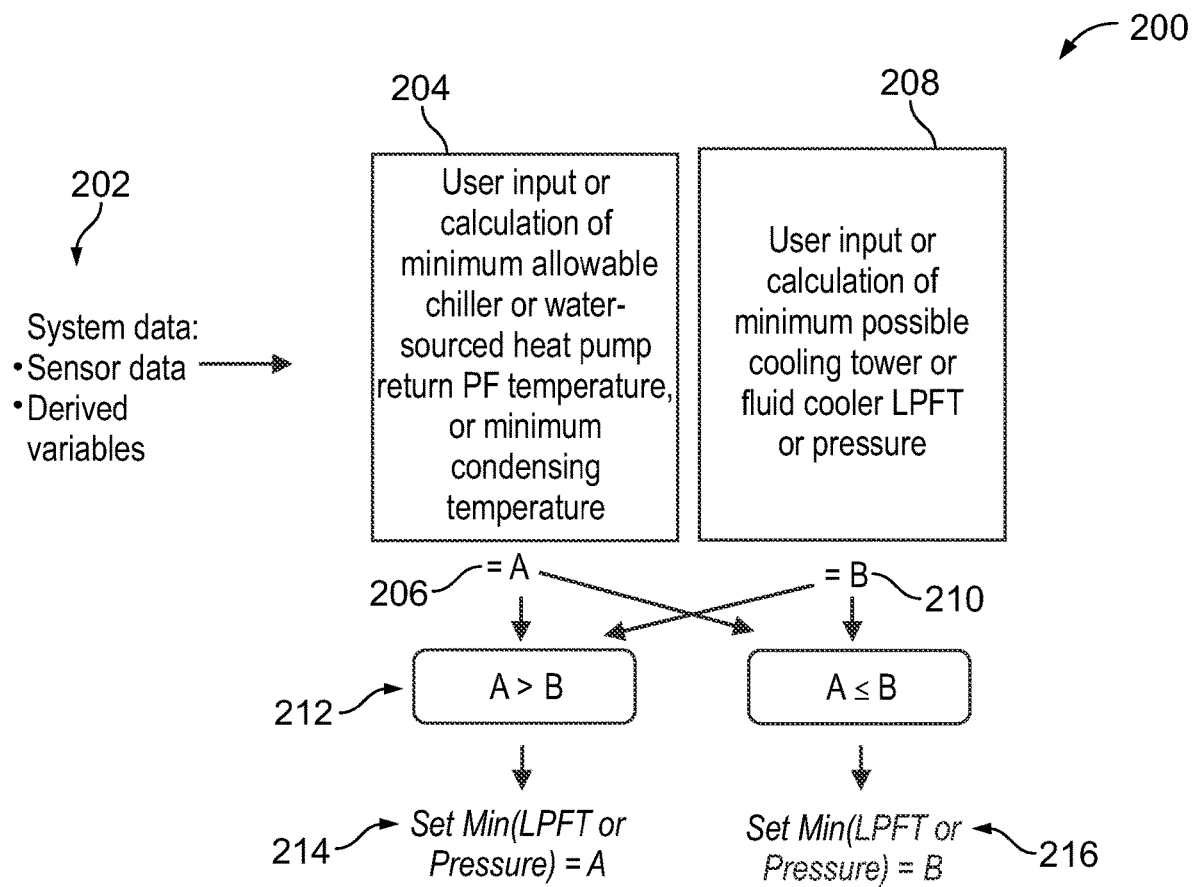
FIG. 4 is a flow diagram of an example method to calculate a minimum process fluid temperature or pressure leaving the cooling tower to be used with the method of FIGS. 3A and 3B.

Regarding FIG. 4, the providing 84 of the plurality of potential parameters to the machine learning models 151 includes providing a minimum and maximum for each potential parameter that corresponds to the cooling subsystem 14. The potential parameters are limited for each case by the limitations of the cooling subsystem 14, such as minimum and maximum return water temperatures.

Determining the minimum of potential parameters that may be provided 84 to the machine learning models 151 may include a method 200 for calculating a minimum temperature and/or pressure of process fluid leaving the heat rejecting apparatus. The method 200 includes gathering 202 the relevant sensor data and deriving parameters as discussed above with respect to operations 100, 102 FIG. 3A. The method 200 includes determining 204 a minimum allowable and achievable process fluid temperature and/or pressure for a heat receiving apparatus based on the expected thermal capacity. The determining 204 may include a user input or a calculation of a minimum allowable chiller or water-source heat pump returned process fluid temperature. The determining 204 may alternatively include a minimum condensing temperature. The determining 204 results in a minimum temperature A represented by reference numeral 206.

The method 200 further includes determining 208 a minimum process temperature and/or pressure for the heat rejecting apparatus. For example, the determining 208 may include a calculation of minimum possible cooling tower or fluid cooler leaving process fluid temperature or pressure. The determining 208 results in a variable B represented by reference numeral 210. The method 200 further includes comparing 212 the variables A and B. If variable A is greater than variable B, then the method 200 includes setting 214 the minimum leaving process fluid temperature and/or pressure to be variable A. If variable A is less than or equal to variable B, the method 200 includes setting 216 the minimum leaving process fluid temperature and/or pressure to be variable B.

Figure 5:
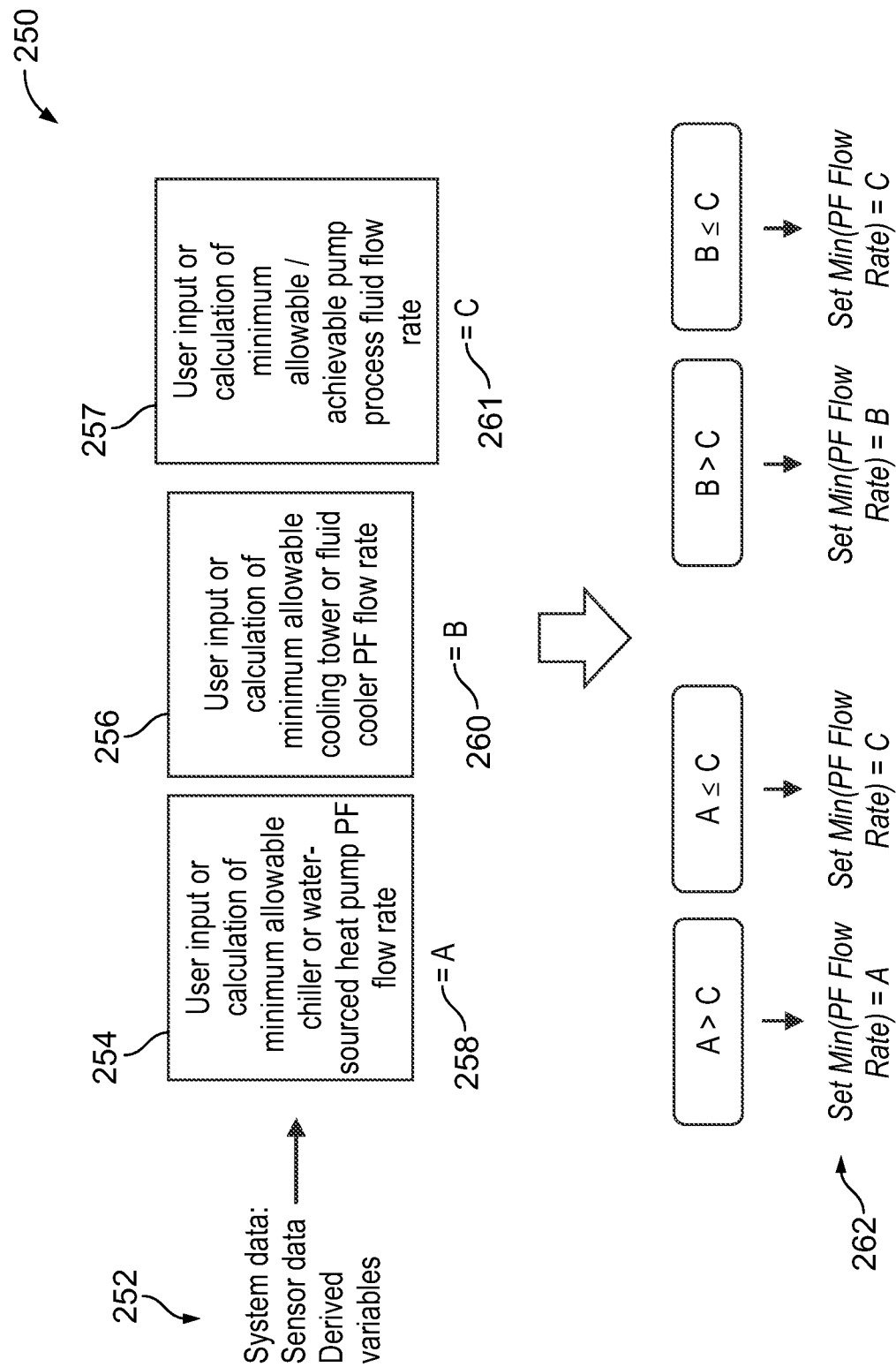
FIG. 5 is a flow diagram of an example method of calculating a minimum process fluid flow rate of the cooling subsystem to be used with the method of FIGS. 3A and 3B.

Regarding FIG. 5, determining the minimum of potential parameters that may be provided 84 to the machine learning models 151 may include a method 250 for calculating a minimum desired process fluid flow rate of the cooling subsystem 14. The method 250 includes gathering 252 relevant sensor data variables and derived variables and determining 254 a minimum process fluid flow rate for the heat receiving apparatus. For example, the determining 254 may include a user input or a calculation of minimum allowable process fluid flow rate for a chiller or water-source heat pump. The method 250 may further include a determination 256 of a minimum process fluid flow rate for the heat rejecting apparatus. The determination 256 may include a calculation of a minimum allowable cooling tower or fluid cooler minimum process fluid flow rate. Example fluid coolers include the PF series, FXV series, HXV, and TCFC series fluid coolers of the Baltimore Aircoil Company of Jessup, Md. for example. The determination 256 may result in different minimum process fluid flow rates depending on whether, for example, the cooling tower 16 is operable in a dry, wet, hybrid, and/or adiabatic mode. The method 250 includes determining 257 a minimum process fluid pump flow rate, which may be set according to data supplied by the pump manufacturer.

The determinations 254, 256 result in variables A 258, B 260, and C 261. The method 250 includes setting 262 the minimum process fluid flow rate to be equal to one of the variables A 258, B 260, or C 261. The setting 262 includes setting the minimum process fluid flow rate to variable A 258 if variable A 258 is larger than variable C 261, to variable C 261 if variable A 258 is less than or equal to variable C 261, to variable B 260 if variable B 260 is greater than variable C 261, or to variable C 261 if variable B 260 is less than or equal to variable C 261.

Figure 6:
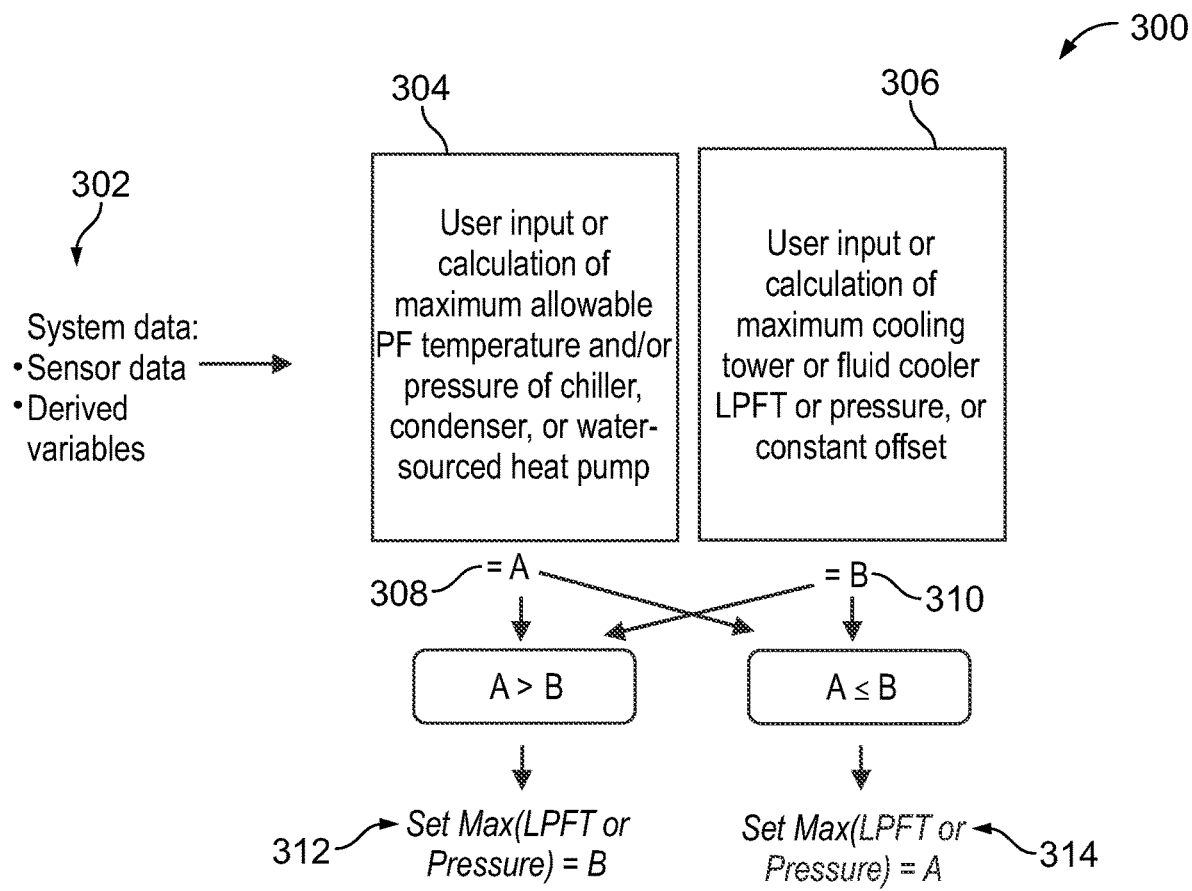
FIG. 6 is a flow diagram of a method of calculating a maximum process fluid temperature or pressure leaving the cooling tower to be utilized with the method of FIGS. 3A and 3B.

Regarding FIG. 6, determining the maximum of potential parameters that may be provided 84 to the machine learning models 151 may include a method 300 of calculating a maximum temperature and/or pressure of the process fluid leaving the heat rejecting apparatus. The method 300 includes gathering 302 relevant sensor data variables and derived variables and determining 304 a maximum process fluid temperature and/or pressure of the heat receiving apparatus. The determining 304 may include a user input or a calculation of a maximum allowable process fluid temperature and/or pressure for a chiller, water-source heat pump, or condenser. The method 300 may further include a determination 306 of a maximum process fluid temperature and/or pressure of the heat rejecting apparatus. The determining 306 may include a user input or a calculation of a maximum allowable process fluid temperature and/or pressure for a cooling tower or a fluid cooler. As another example, the determining 306 may involve using a constant offset from the entering water temperature (if range is held constant) or from entering air wet bulb temperature (if approach is held constant). The determinations 304, 306 result in variable A 308 and variable B 310. The method 300 includes setting 312 the maximum leaving process fluid temperature and/or pressure to be equal to variable B if variable A 308 is greater than variable B. The method 300 includes setting 314 the maximum leaving process fluid temperature and/or pressure to be equal to variable A 308 if variable A 308 is less than or equal to variable B 310.

Figure 7:
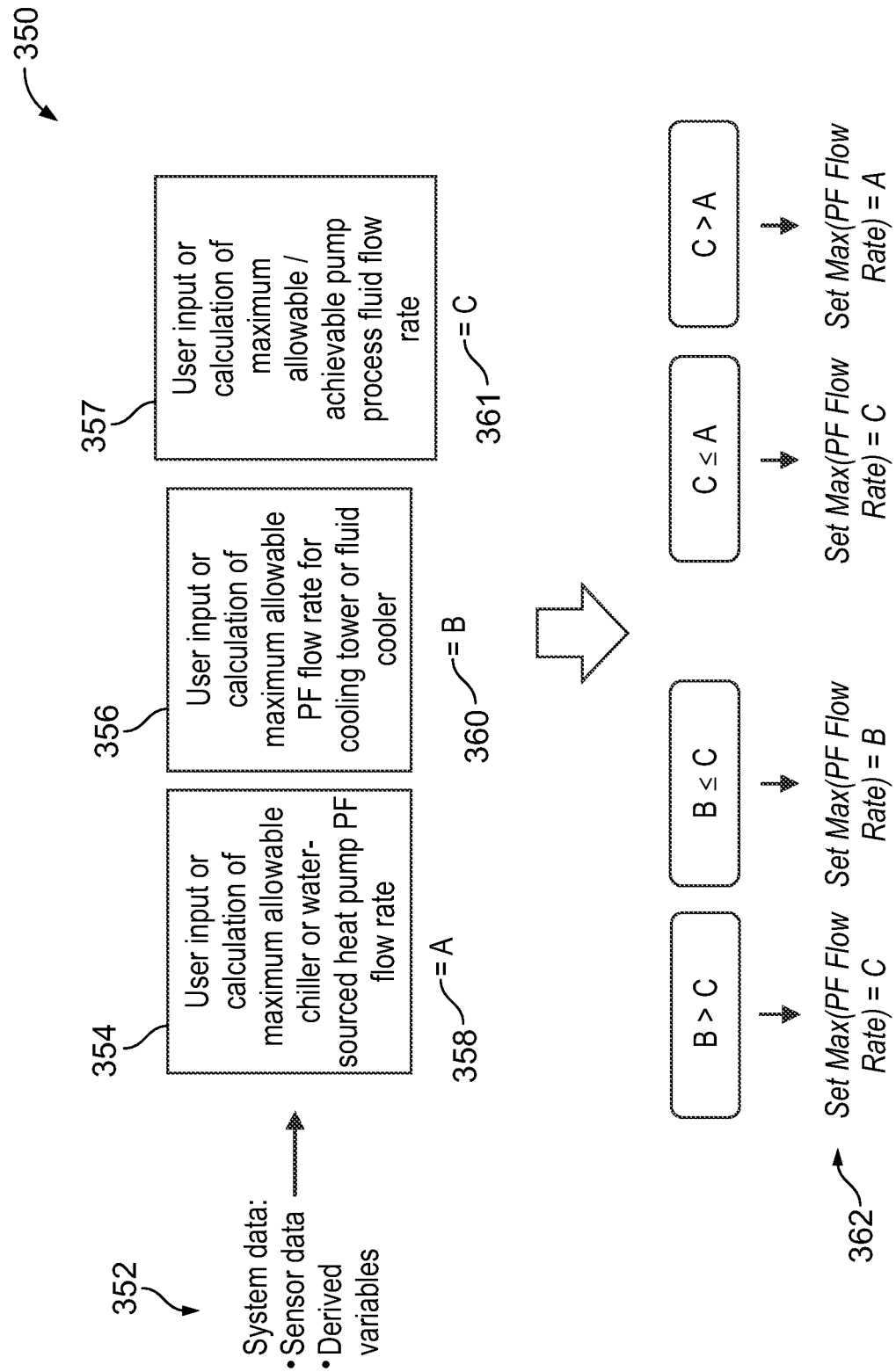
FIG. 7 is a flow diagram of an example method for calculating a maximum process fluid flow rate of the cooling subsystem to be utilized with the method of FIGS. 3A and 3B.

Regarding FIG. 7, determining the maximum of potential parameters that may be provided to the machine learning models may include a method 350 of calculating a maximum process fluid flow rate. The method 350 includes gathering 352 relevant sensor data variables and derived variables and determining 354 a maximum process fluid flow rate of the heat receiving apparatus. The determining 354 may include a user input or calculation of a maximum allowable process fluid flow rate for a chiller or a water-source heat pump. The method 350 further includes determining 356 a maximum process fluid flow rate of the heat rejecting apparatus. The determining 356 may include a user input or calculation of maximum allowable process fluid flow rate for a cooling tower or a fluid cooler. The method 350 includes determining 357 a maximum process flow rate, which may be set according to data supplied by the pump manufacturer. The determining 354, 356, 357 result in variable A 358, variable B 360, and variable C 361.

The method 350 includes setting 362 the maximum process fluid flow rate to be equal to variable C 361 if variable B 360 is greater than variable C 361, to variable B 360 if variable B 360 is less than or equal to variable C 361, to variable C 361 if variable C 361 is less than or equal to variable A 358, or to variable A 358 if variable C 361 is greater than variable 358.

Regarding FIGS. 8 and 9, the machine learning models 151 for the system water consumption 150, system energy consumption 152, and chemical consumption 156 may each involve one or more machine learning models. In one example, the machine learning models water consumption 150, energy consumption 152, and chemical consumption 156 each include a plurality of machine learning models with a first machine learning model using a weighted k-nearest neighbors regression (w-k-NN) 400 as shown in FIG. 8 and a second machine learning model using a neural network regression (NN) 450 as shown in FIG. 9

Regarding FIG. 8, the w-k-NN regression 400 is shown being trained with values that correlate between a building load 402 on the x-axis and the energy consumption 404 of the cooling subsystem 14 on the y-axis. FIG. 8 is an example and, in application, one or more parameters described above with reference to FIG. 3A will be considered. For a given input $x_1 \ldots x_n$, the model 400 finds the k-nearest neighbors (e.g., k=4). The w-k-NN regression 400 then computes a weighted average based on distance of the k-nearest neighbors to predict an output value, $y_1 \ldots y_n$, for the inputs $x_1 \ldots x_n$. The historical data used to train the w-k-NN regression 400 may include live data as well as data from previous collections of sensor data. Thus, for a given building load value 402, the machine learning model using the w-k-NN regression 400 will be able to provide an estimated energy consumption 404 for the cooling subsystem 14. A similar approach may be used to estimate water consumption.

Regarding FIG. 9, the neural network (NN) regression 450 produces a neural network of relationships between one or more inputs 452 and an output 454. The NN regression 450 utilizes historical data of the cooling subsystem 14 to develop hidden layers 454, $h_1(1) \ldots h^x(n)$, and output layers 456, $f^1 \ldots f^n$, to model the relationships between the inputs 452 and the output 454. The output 454 may be, for example, energy consumption of the cooling subsystem 14. In this example, the load on the cooling subsystem 14, air dry bulb temperature, air wet bulb temperature, and temperature of water leaving the cooling tower 16 are provided as inputs 452 and the system energy consumption is provided as the output 454. Thus, for a given load, air dry bulb temperature, air wet bulb temperature, and leaving water temperature, the machine learning model using the neural network (NN) regression 450 may provide an estimated energy consumption output 454 for the cooling subsystem 14. A similar approach may be used to model/predict water consumption.

As an example and with respect to FIGS. 3B and 10-12, the calculating 160 includes using the machine learning models with the w-k-NN regression 400 and NN regression 450 to calculate energy consumption (FIG. 10), water consumption (FIG. 11), and operating cost (FIG. 12) for the cooling subsystem 14 for possible combinations of operating modes of the cooling tower, temperature and pressure of process fluid leaving the cooling tower 16, and the flow rate of the process fluid. The possible combinations may be all or less than all possible combinations of possible parameters for the operating mode, leaving process fluid temperature and pressure, and process fluid flow rate. As discussed above with respect to FIGS. 4-7, individual ones of the potential parameters have a minimum and a maximum value that reflects the components of the cooling subsystem 14.

Regarding FIGS. 10-12, the cooling subsystem controller 52 has provided a range of temperatures of process fluid leaving the cooling tower 16, e.g., possible leaving water temperature set points 502 to the water consumption machine learning model 150 and the system energy machine learning model 152 to estimate the energy consumption 500, water consumption 501, and the operating cost 503 of the cooling subsystem 14 for the range of leaving water temperature set points 502. The scatterplots of FIGS. 10-12 graphically represent the estimated energy consumption 500, water consumption 501, and operating cost 503 for each of the possible leaving water set points 502 as predicted by either the w-k-NN regression 400 or the NN regression 450 for each of the machine learning models 150, 152. The estimates of the scatterplots may be generated, for example, every hour to decide whether to adjust the cooling system 14 in response to current conditions. The model used to determine operating cost 503 may utilize the estimated energy consumption 500, estimated water consumption 501, and cost of energy and water included in the pricing data 119.

Regarding FIGS. 3B and 10-12, determining 86 includes searching 170 for the optimal operating parameters for the cooling subsystem 14 by providing leaving water temperatures in the range of 69° F. to 84° F. to the machine learning models 150, 152. The searching 170 may include searching the estimated energy consumption 500, estimated water consumption 501, and estimated cost 503 for minimum values and determining the leaving water temperature set point 502 that corresponds to the minimum value. The estimated energy consumption 500, estimated water consumption 501, and estimated cost 503 may be determined based on the estimated energy consumption and estimated water consumption used by the cooling subsystem 14 upon implementing the operating parameters using the machine learning models representative of the cooling subsystem 14. For example in FIG. 10, the minimum energy consumption 504 predicted by energy consumption machine learning model 152 using the w-k-NN regression 400 occurs at a leaving water temperature set point of 75° F. The minimum energy consumption 506 predicted by the energy consumption machine learning model 152 using the NN regression 450 occurs at a leaving water temperature set point of 74° F.

The cooling subsystem controller 52 may then adjust, for example, the operating mode of the cooling tower 16, the status of a pump of the fluid distribution system 26, the speed of the fan 22, and/or the speed of the pump 20 to cause the cooling subsystem 14 to have the desired leaving water temperature set point of 75° F. to achieve the minimal energy consumption predicted by the energy consumption machine learning model 152 using the w-k-NN regression 400. In this example, the energy consumption machine learning model 152 using the w-k-NN regression 400 may have a higher confidence level than the energy consumption machine learning model 152 using the NN regression 450. Alternatively, the cooling subsystem controller 52 may adjust the components of the cooling subsystem 14 to achieve the desired leaving water temperature set point of 74° F. if the energy consumption machine learning model 152 using the NN regression 450 has a higher confidence level. As yet another example, the cooling subsystem controller 52 may operate the components of the cooling subsystem 14 to achieve a leaving water temperature set point determined by a weighted average of the leaving water temperatures 74° F., 75° F. with weights being assigned to the temperatures based on confidence intervals of the associated machine learning models 152.

Regarding FIG. 11, the water consumption machine learning model 150 has been used to estimate water consumption of the cooling subsystem 14 for a range of leaving water temperatures from 69° F. to 84° F. The water consumption learning model 152 utilizing the w-k-NN regression 400 estimates a minimum water consumption 552 at a leaving water temperature of 76° F. while the water consumption learning model 150 utilizing the NN regression 450 estimates a minimum water consumption 550 at a leaving water temperature of 75° F. In order to achieve the target optimization objective of minimizing water consumption of the cooling subsystem 14, the cooling subsystem controller 52 may adjust, for example, the operating mode of the cooling tower 16, the status of a pump of the fluid distribution system 26, the speed of the fan 22, and/or the speed of the pump 20 to cause the cooling subsystem 14 to achieve the leaving water temperature set point of 76° F. The cooling subsystem controller 52 may similarly adjust the components of the cooling subsystem 14 to achieve the leaving water temperature set point of 75° F. if the water consumption machine learning model 150 utilizing the NN regression 450 has a higher confidence level. As another example, the optimal leaving water temperature set point may be calculated as a weighted average of the 75° F. and 76° F. values.

Regarding FIG. 12, the operating cost 503 has been calculated using the estimated water consumption 500, the estimated water consumption 501, and the costs of energy and water for the range of leaving water temperatures from 69° F. to 84° F. The operating cost 503 estimated by the machine learning models 150, 152 utilizing the w-k-NN regression 400 estimates an operating cost minimum 582 at a liquid water temperature set point of 75° F. The operating cost 503 estimated by the machine learning models 150, 152 utilizing the NN regression 450 estimates an operating cost minimum 580 at a temperature of 74° F. The cooling subsystem controller 52 may adjust the control settings of the components of the cooling subsystem 14 to achieve the desired leaving water temperature set point of 75° F. based on the w-k-NN regression 400, 74° F. based on the NN regression 450, or a set point derived from the 75° F. and 74° F. values, to achieve the target optimization criterion of minimizing operating cost of the cooling subsystem 14.

Comparing FIGS. 10, 11, and 12, it is apparent that the water and energy consumption machine learning models 150, 152 utilizing the w-k-NN and NN regressions 400, 450 may provide different recommended leaving water temperature set points depending on whether the target optimization criterion is minimizing water consumption, minimizing energy consumption, or minimizing operating cost. In this manner, the method 80 permits the operation of the cooling subsystem 14 to be optimized for a desired optimization objective.

The cooling subsystem controller 52 may implement the method 80 continuously or periodically. As some examples, all or a portion of the method 80 may be performed seasonally, weekly, monthly, daily, every 12 hours, every 4 hours, every hour, every fifteen minutes, and/or every 30 seconds as examples. The sampling rate and optimization frequency may vary over time and may be parameters that are adjusted to achieve the optimization criterion. For example, the optimization frequency may adjusted from occurring every hour to occurring every two hours to determine the optimization frequency that best achieves the desired optimization criterion. The optimization frequency may be adjusted by, for example, a user, pre-set rules, and/or autonomously.

In one embodiment, the cooling subsystem controller 52 aggregates 82 data for a fifteen minute period, provides 84 and determines 86, implements 99 the determined optimal parameter, and repeats the process every hour. The cooling subsystem controller 52 may implement the method 80 according to a schedule. Alternatively or additionally, the cooling subsystem controller 52 may implement the method 80 in response to an event, such as the ambient environment or an internal building temperature going above or below a threshold or deviating from a predetermined range of temperature values.

Figure 13:
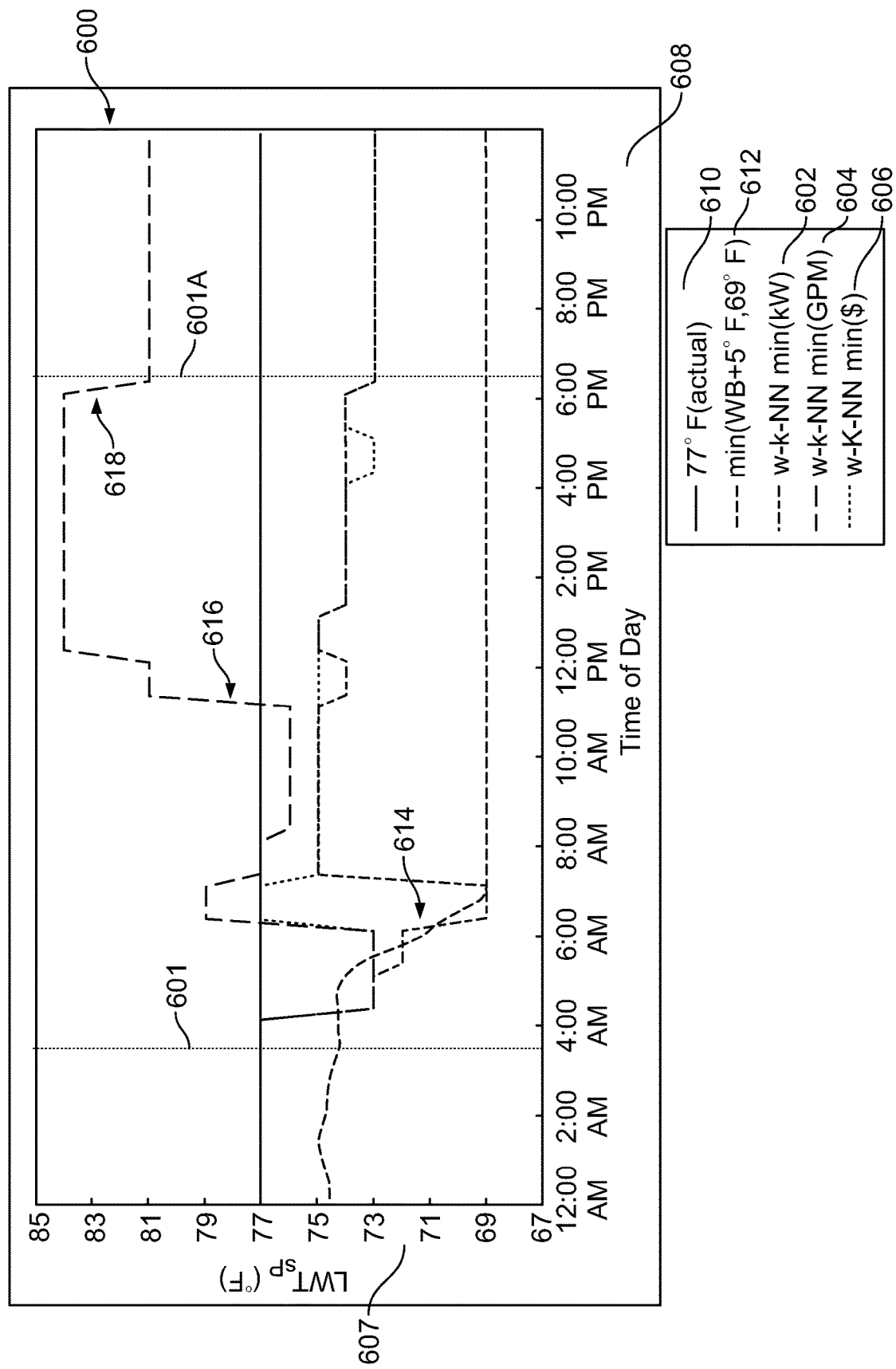
FIG. 13 is a graph of an example leaving water temperature set point recommendations for a cooling subsystem cooling tower to minimize energy consumption, water usage, or operating cost as estimated by a machine learning model using a weighted k-nearest neighbor regression.

The cooling subsystem controller 52 continually determines 86 optimal parameters based on the changing environment and operating conditions of the cooling subsystem 14. Regarding FIG. 13, a test was performed using an example cooling subsystem controller 52 analyzing data for a 60,000 square foot building in North America for a twenty-four hour time period using a 200 ton cooling tower with a 5 hp fan motor, two 7.5 hp pumps operating one at a time, and a 200 ton chiller with a 100 hp motor. FIG. 13 is a graph 600 of leaving water temperature set point recommendations 607 by the cooling subsystem controller 52 over time 608 as determined by the water and energy consumption machine learning models 150, 152 using the w-k-NN regression 400. The graph 600 shows the variation of the leaving water set point recommendation 607 over a twenty-four hour period. The graph 600 was produced using a day's worth of data from the cooling subsystem of the building.

The different lines of the graph 600 indicate estimates of leaving water temperature set point recommendations 607 to achieve a target optimization criterion of minimizing energy consumption 602, minimizing water consumption 604, or minimizing operating cost 606. Graph 600 includes a fixed approach 612 calculated using a standard advanced rules-based controller with the minimum leaving water temperature set point limited by chiller capability.

Before 601, the cooling subsystem 14 is turned off so all setpoint values are the same except the fixed approach 612 since the fixed approach 612 can be calculated at all times and is not based on operating conditions.

Once the cooling subsystem 14 turns on at 601, the water and energy consumption models 150, 152 start receiving live data and are able to start making recommendations every hour using a 15 minute sampling rate. The recommendations 602, 604, 606 are initially close to one another after the cooling subsystem 14 is turned on at 601, diverge from one another, and stop changing once the cooling subsystem 14 has been turned off at 601A.

For the testing reflected in FIG. 13, the actual leaving water temperature 607 was held constant at 77° F. for illustrative purposes while the cooling system controller 52 calculated the leaving water temperature set point recommendations 607. In other words, the cooling subsystem controller 52 calculated the leaving water temperature set point recommendations 607 but did not adjust the components of the cooling subsystem 14. This was done to provide a baseline against which the optimization recommendations 602, 604, 606 may be observed.

In the graph 600, the optimization recommendations 602, 604, 606 change very often which highlights the need for dynamic optimization. Specifically, system cooling load and ambient conditions frequently vary and the cost of energy and water may vary dynamically as well. The large variations in the optimization estimates 602, 604, 606 highlight the model's responsiveness of the method 80 to sudden changes such as sun rise and building solar load spikes. The first sudden change 614 in the optimization recommendations 602, 604, 606 is attributable to sun rise and people coming into the building (roughly around 7 AM-9 AM). The remainder of the morning is relatively steady as the sun shines on one side of the building and ambient temperatures have steadied. The second sudden change 616 occurs around the beginning of the afternoon. People are coming back from lunch and the sun is completely out and shining on the building with the most windows and the least amount of shade. These factors increase the load on the cooling subsystem 14. The afternoon load is the highest because the building is at maximum occupancy, the sun has been up for many hours and has heated the building, and ambient air temperature is highest. The third sudden change 618 is linked to people leaving the building at the end of the business day and the sun setting.

In graph 600, the optimization recommendations 602, 606 are fairly close to each other because water cost at the test site was much lower than the cost of energy. Contrary to industry common knowledge, minimizing the water consumption, energy consumption, or operating cost does not necessarily lead to minimizing energy usage due to the highly non-linear performance curves of the components of the cooling subsystem 14. In graph 600, the minimum energy optimization recommendation 602 and minimum cost optimization recommendation 606 are fairly close because water is fairly inexpensive at the test site; however, FIGS. 10 and 11 show that the rate of increase or decrease of water and energy consumption with increase/decrease in leaving water setpoint are very different. This indicates that, based on relative energy and water cost, the optimal leaving water temperature setpoint may skew toward minimum energy draw if energy is expensive compared to water (and chemicals), toward minimum flow rate if the opposite is true, or somewhere in the middle.

Figure 14:
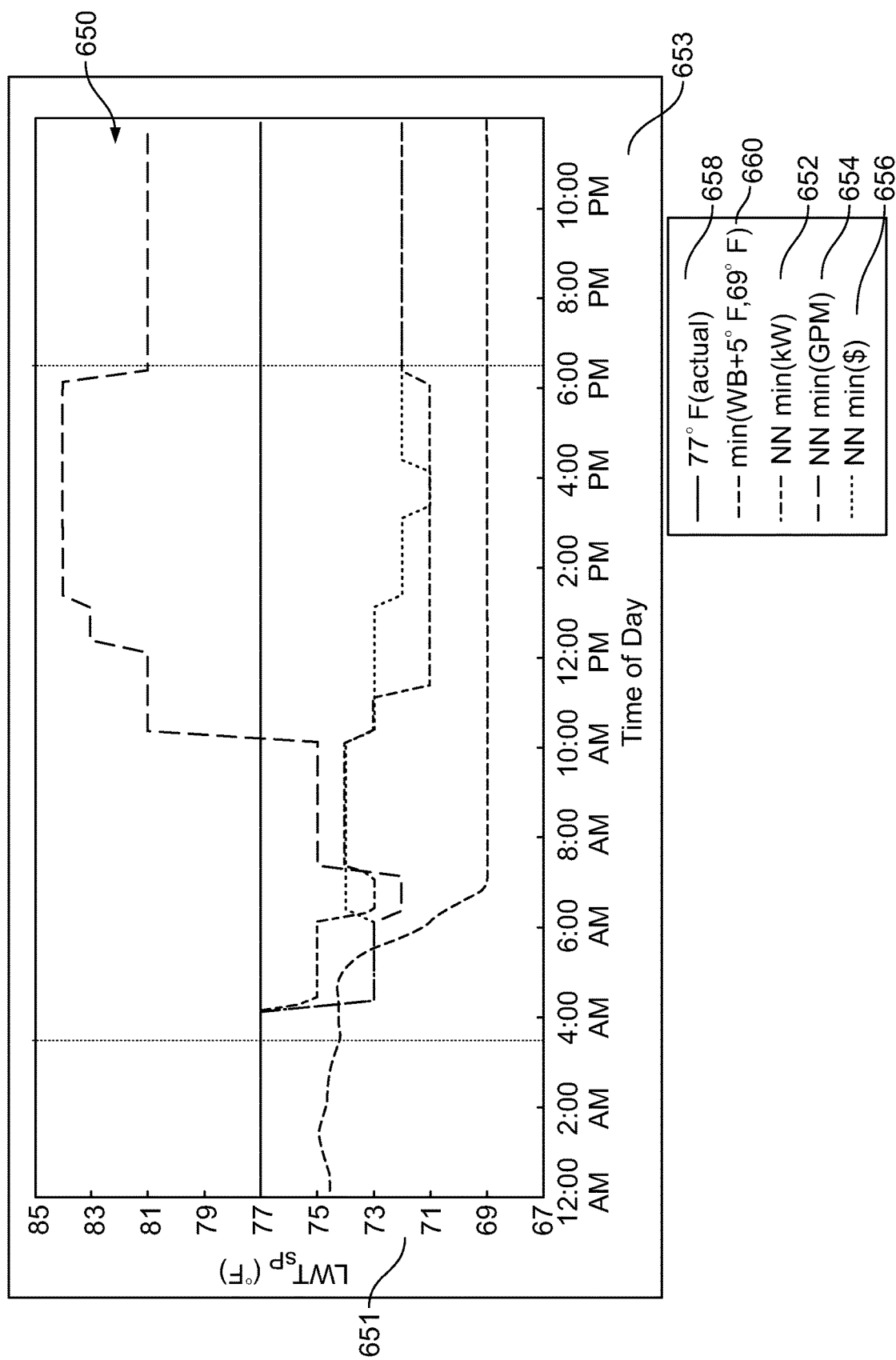
FIG. 14 is a graph showing an example of leaving temperature set point recommendations of a cooling subsystem cooling tower to minimize energy consumption, water usage, or operating cost as estimated by a machine learning model using a neural network regression.

Regarding FIG. 14, a graph 650 is provided of example leaving water temperature set point recommendations 651 over time 653 as determined by the water and energy consumption machine learning models 150, 152 using the NN regression 450. The graph 650 is based on the same testing data as the graph 600, but the different regression approaches used in the different figures result in different recommended leaving water temperatures. The different lines of the graph 650 indicate recommendations for leaving water temperature set points 651 to achieve a target optimization criterion of minimizing energy consumption 652, minimizing water consumption 654, or minimizing operating cost 656. The graph 650 includes a constant leaving water temperature set point 658 and a fixed approach 660 calculated using a standard advanced rules-base controller with minimum leaving water temperature limited by chiller capability.

The spikes and values for the recommendations 652, 654, 656 vary from the spikes and values of the optimizing estimates 602, 604, 606 because the modeling approach is different but the overall trends are similar.

By comparing FIGS. 13 and 14, it is shown that the leaving water temperature recommendations of the water and energy consumption machine learning models 150, 152 vary depending on whether the w-k-NN regression 400 or the NN regression 450 is used.

Figure 15:
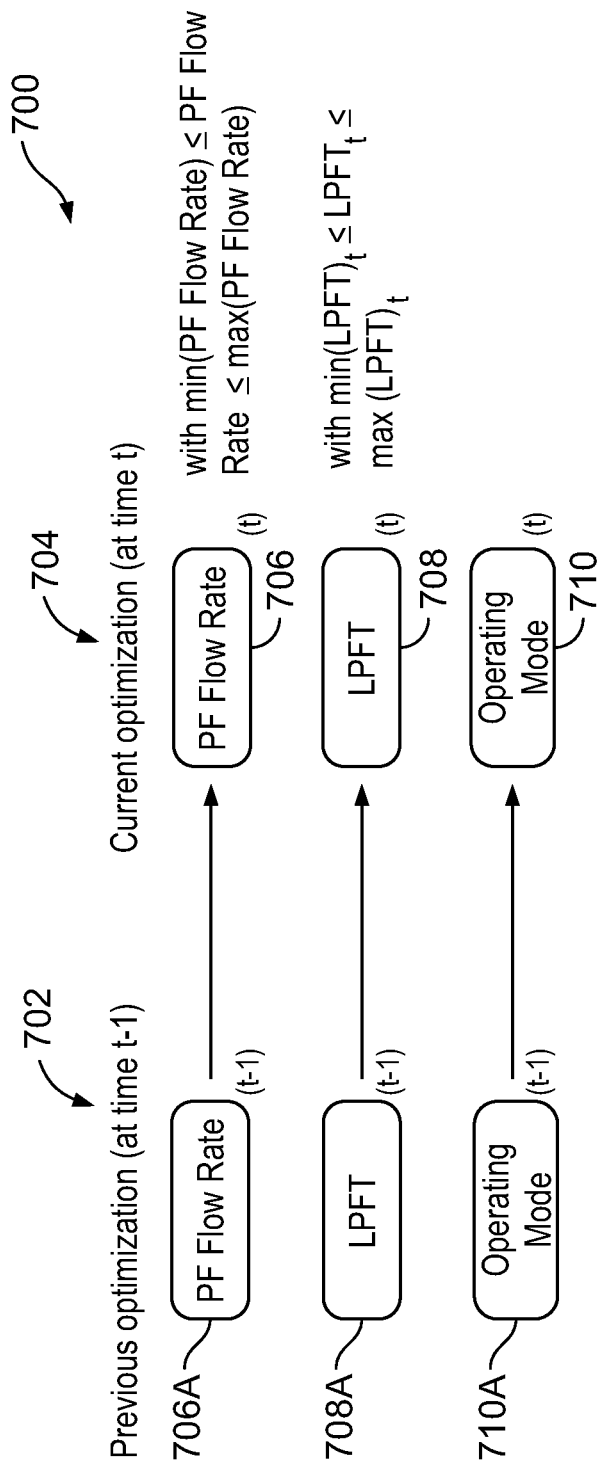
FIG. 15 is a flow diagram of recommended set points and an operating mode for a cooling subsystem cooling tower that are unconstrained by previous set points and a previous operating mode.

Regarding FIGS. 3B and 15, the calculation 160, searching 170, and returning 172 of the optimal parameter(s) may be unconstrained by previous parameter(s). For example, the method 700 shows recommended optimal parameters 702 at a time$_{t-1}$. The calculating 160, searching 170, and returning 172 provides current recommended optimal parameters 704 at time$_t$ including a process fluid flow rate 706, a leaving process fluid temperature 708, and operating mode 710. The process fluid flow rate 706 is between the minimum process fluid flow rate and the maximum process fluid flow rate of the cooling subsystem 14 without respect to the process fluid flow rate 706A of time$_{t-1}$. Likewise, the leaving process fluid temperature 708 is between the minimum leaving process fluid temperature and maximum leaving process fluid temperature of the cooling subsystem 14 but without respect to the leaving process fluid temperature 708A. Still further, the optimal operating mode 710 is determined without being constrained by the operating mode 710A.

Figure 16:
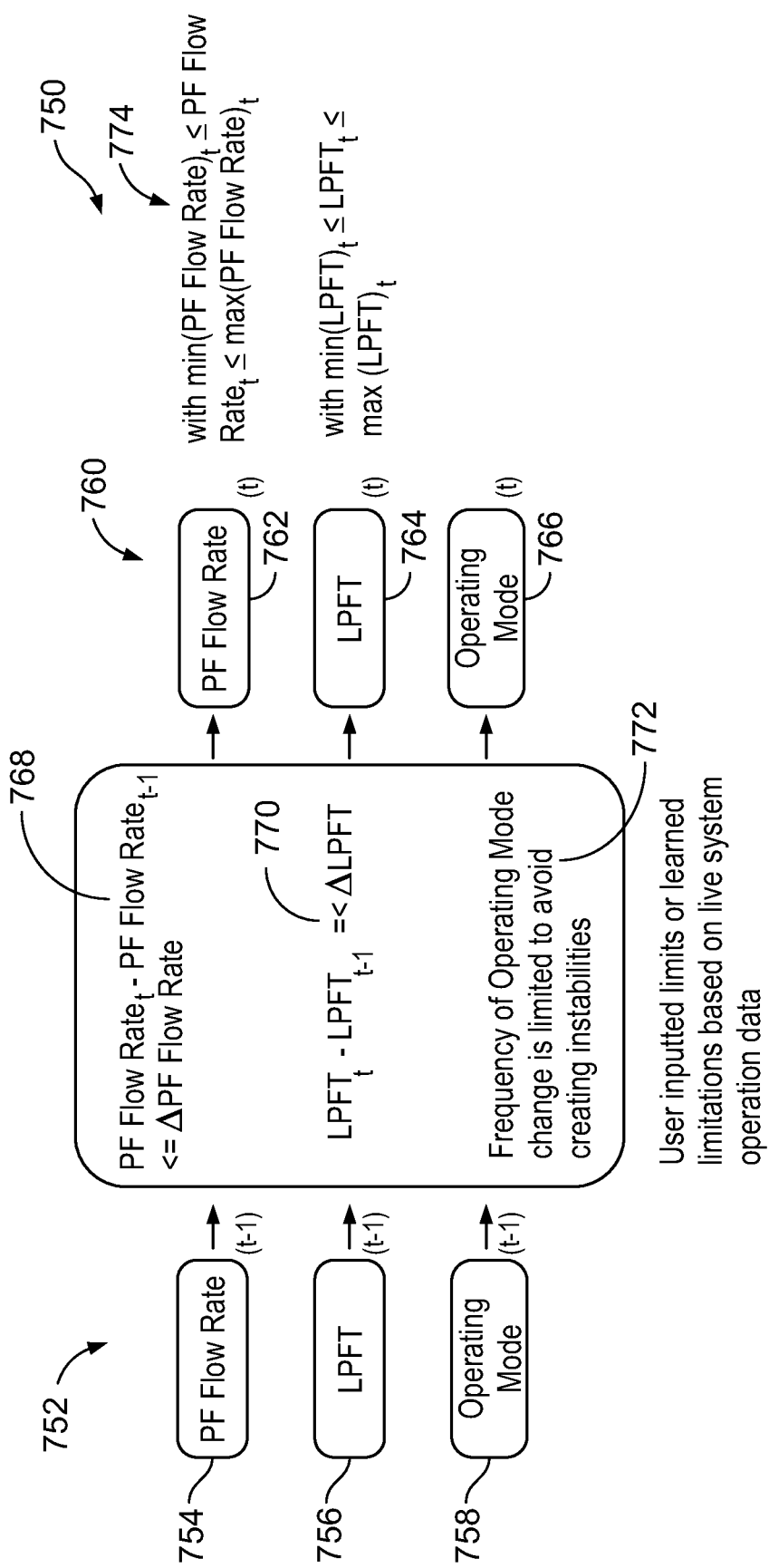
FIG. 16 is a flow diagram of recommended set points and an operating mode for a cooling subsystem cooling tower that are constrained by previous set points and a previous operating mode.

With reference to FIG. 16, in another embodiment, one or more of the calculation 160, searching 170, and returning 172 of optimal parameters may be constrained by previous parameters. For example, the method 750 includes providing 752 optimal parameters including a process fluid flow rate 754, leaving process fluid temperature 756, and operating mode 758 at time$_{t-1}$. The method 750 includes calculating 160, searching 170, and returning 172 optimal parameters at time$_t$ including a process fluid flow rate 762, a leaving process fluid temperature 764, and an operating mode 766. However, the change in flow rate between 762 and 754 is limited to a predetermined ΔPF flow rate 768 to avoid creating instabilities. Further, the difference between the leaving process fluid temperature 764 and the leaving process temperature 756 is limited to a predetermined ΔLPFT 770 to avoid creating instabilities. Thus, the minimum and maximum process fluid flow rate and leaving process fluid temperatures are constrained to ranges 774 that are dependent upon the preceding operating values 752. Still further, the operating mode 766 is limited 772 by the operating mode 758 to a predetermined frequency of operating mode changes to avoid creating instabilities. The constraints on change from previous optimal parameters may be set by user inputted limits or learned limitations based on historical data of the cooling subsystem 14. In some embodiments, the process fluid flow rate 762 and the leaving process fluid temperature 764 may be replaced by leaving refrigerant temperature or pressure for condenser applications.

Figure 17:
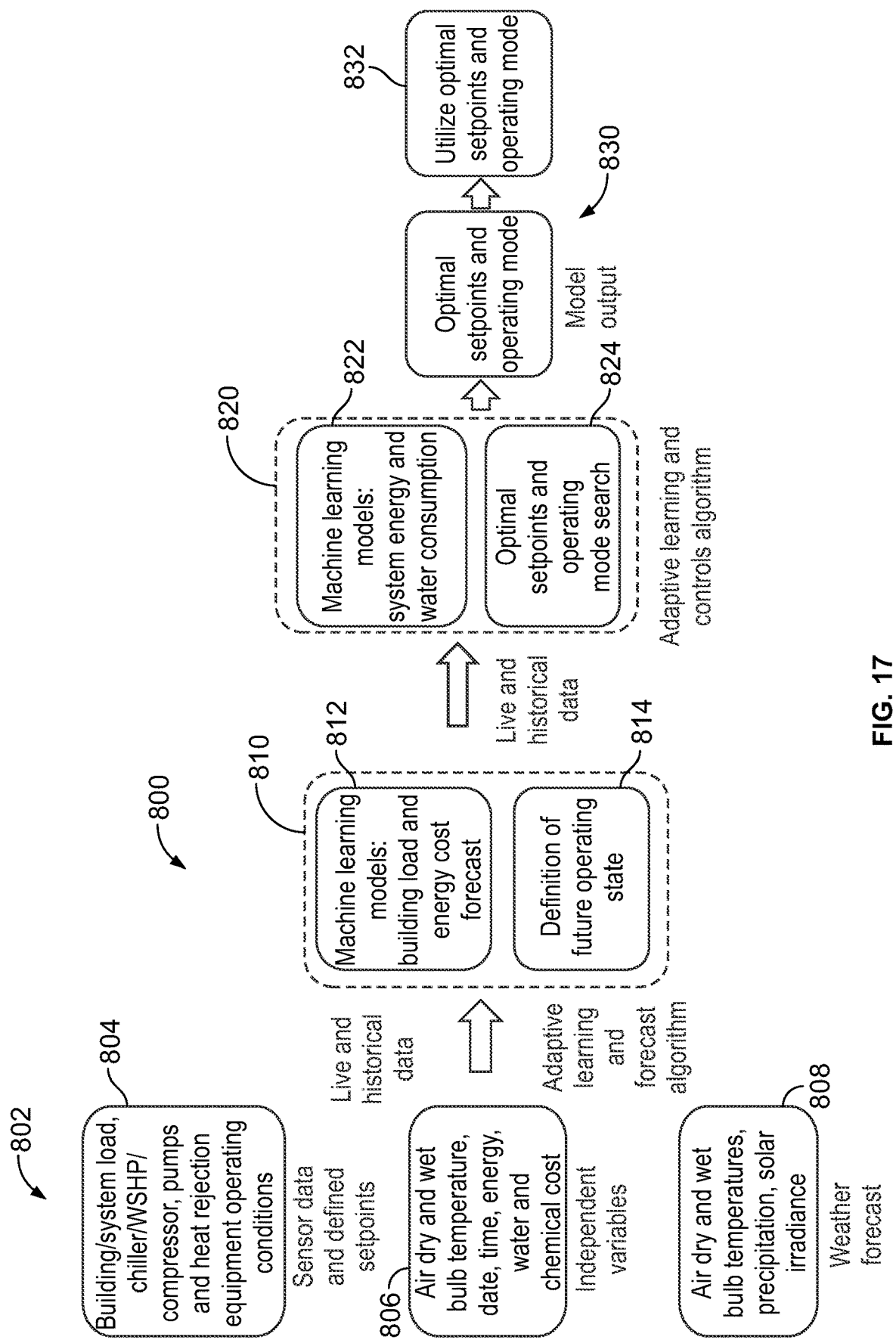
FIG. 17 is a flow diagram of a method that includes providing recommended set points and a cooling tower operating mode for a cooling subsystem based on a prediction of a future state.

With reference to FIG. 17, a method 800 is provided that is similar in many respects to method 80 discussed above such that differences will be highlighted. The method 800 provides one or more estimated optimal parameters for the cooling subsystem 14 based on a prediction of a future state of the cooling subsystem 14 rather than current conditions.

The method 800 includes aggregating 802 variables including collecting 804 variables of the cooling system 14 and including collecting 806 environmental variables. The aggregating 802 further includes collecting 808 weather forecast data such as dry bulb temperature, wet bulb temperature, precipitation, and solar irradiance forecasts. The aggregating 802 may also include identifying at least one time-related variable such as time of day, date, month, and season. The method 800 includes estimating 810 future operating conditions of the cooling subsystem 14. Estimating 810 includes utilizing 812 machine learning models for building load and energy cost forecast, which may be similar to the machine learning models described above for estimating energy and water consumption. One potential difference may be the input parameters. In the case of load forecasting, the input parameters may include at least one of the time of day/week/year, weather data (live and forecast), and live occupancy data. For energy cost forecasting, the input parameters may include at least one of time of day/week/year and weather data (live and forecast). The estimating 810 further includes defining 814 the future operating state of the system such as estimating the operating variables of the cooling subsystem 14 at a particular time and day in the future. The defining 814 may be similar to the approach discussed above with respect to FIG. 15, but instead of going from (t−1) to (t), the method 800 includes using data at (t) or (t−1) to predict state (t+n) such as using the load forecast, weather forecast, and recommend setpoints/mode. In effect, the method 800 may anticipate changes in operating conditions and makes proactive changes to avoid operating in sub-optimal fashion to compensate for a possibly sudden change in operating conditions in the future.

Using this approach, achieving the target optimization criterion may be further improved since the model accounts for the predicted operation of the cooling system in the future, and thus considers the operation of the cooling system over a greater period of time. The cooling system is not only considering which settings would result in achieving the target optimization criterion at a particular moment in time, but uses the predicted future operation of the cooling system to inform how the cooling system should currently be operated. As one example, if the current weather conditions are clear with high temperatures, but the weather forecast includes a sudden drop in ambient temperature along with several hours of rain, the cooling system may reduce the cooling provided in anticipation of the future cooler ambient temperatures and rain to conserve energy and water usage for example. As another example, the cooling system may operate in an arid area where, for instance, the amount of water usage is limited by government regulation. The cooling system may be allotted a certain number of gallons of water to use throughout the day. Predicting the future operating conditions of the cooling system, method 800 may involve determining when the cooling system should use the limited water supply throughout the day based on the predicted cooling load of the cooling system. Determining when the water will be used may be based in part on the target optimization criterion and how the target optimization criterion may best be achieved over the course of the entire day, rather than only considering the current and/or historical conditions. Thus, method 800 may predict the future operating conditions of the cooling system and update the currently implemented control settings accordingly.

As another example, the cooling system 10 may use predicted or forecasted energy and/or water cost data to guide the operation the cooling system 10. For instance, knowing that the energy cost or water cost will increase in the future may cause the cooling system 10 to operate to optimize the operation of the cooling system 10 based on the past, current, predicted operating parameters and conditions. For example, where the cooling system 10 includes thermal energy storage, such as an ice thermal storage system, the cooling system 10 may be configured to consume energy to create ice while the cost of energy is low and discharge or use the energy stored in the ice to provide cooling to reduce energy consumption from the grid when the cost of energy is high. By using predicted or forecasted energy costs, the cooling system 10 can update the current operating parameters in anticipation of future changes.

The method 800 further includes providing 820 a plurality of potential operating parameters to one or more machine learning models, such as water and energy usage machine learning models that are similar to the models 151 discussed above. The providing 820 may include providing 822 the water and energy usage machine learning models of the cooling subsystem 14. The water and energy usage machine learning models may utilize the environmental variables and cooling subsystem variables of the future operating state defined at operation 814. The potential parameters may each be within a minimum and maximum for the potential parameter that corresponds to the defined future state of the cooling subsystem 14.

The providing 820 further includes searching 824, in a manner similar to the searching 170 discussed above, for one or more optimal operating parameters of the cooling subsystem 14 based on the defined future state of the cooling subsystem 14. For example, the searching 824 may include searching for minimums of energy consumption, water consumption, and operating cost estimated by the water and energy consumption machine learning models.

The method 800 further includes determining 830 one or more optimal operating parameters for the cooling subsystem 14 based on a target optimization criterion such as minimizing water consumption, minimizing energy consumption, or minimizing operating cost. The cooling subsystem controller 52 may implement 832 the recommended one or more optimal parameters so that the cooling subsystem 14 operates in a manner currently that achieves the target optimization criterion at the day/time of the defined future state. In one embodiment, the method 800 may include anticipating changes in operating conditions and making proactive changes to the cooling subsystem 14 to avoid operating in sub-optimal fashion to compensate for a potential sudden change in operating conditions in the future. For example, the method 800 may include pre-cooling the associated building several hours before people come into the building in the morning and/or preemptively decreasing system capacity in anticipation of lunchbreak and/or the end of the work day. A decision to pre-cool the building may be driven in part by an increase in energy cost later in the day. Alternatively or additionally, the method 800 may include charging a thermal energy storage system when the system load is low and discharging the thermal energy storage system during time when the load on the cooling system is high, such as when many people will be entering/exiting the building. As another example, a building may be set at a first temperature (e.g., 70° F.) for a certain hours of the day (e.g., 8 AM-5 PM) and set to a second temperature (75° F.) for the remainder of the day (5 PM-8 AM). Anticipating the change in the building temperature point, the cooling subsystem controller 52 may implement a change that achieves the target optimization criterion over an extended period of time rather at that moment. For instance, continuing the example above, using method 800 may result in reduced cooling provided by the cooling system after 4:30

PM in anticipation of the building temperature setpoint change at 5 PM if the machine learning model predicts the building temperature will remain within an acceptable range from the first temperature setpoint until 5 PM.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

While there have been illustrated and described particular embodiments of the present invention, it will be appreciated that numerous changes and modifications will occur to those skilled in the art, and it is intended for the present invention to cover all those changes and modifications which fall within the scope of the appended claims.

What is claimed is:

1. A heat exchanger system comprising:
    a cooling system comprising:
        a heat generating apparatus configured to transfer heat to a process fluid;
        a heat rejection apparatus configured to remove heat from the process fluid;
        a sensor configured to detect a variable of the cooling system at a first time;
    processor circuitry operably coupled to the sensor and configured to provide the variable and a plurality of potential operating parameters for operating the cooling system at a second time to a machine learning model representative of the cooling system to estimate at least one of energy consumption, water usage, and chemical usage of the cooling system for each of the potential operating parameters;
    the processor circuitry configured to determine, based at least in part on the estimated at least one of energy consumption, water usage, and chemical consumption for the potential operating parameters, an optimal operating parameter of the cooling system to satisfy a target optimization criterion; and
    the processor circuitry configured to cause the cooling system to utilize the optimal operating parameter as the cooling system operates at the second time.

2. The heat exchanger system of claim 1 wherein the target optimization criterion is minimizing energy consumption, minimizing water usage, minimizing chemical consumption, or minimizing cost.

3. The heat exchanger system of claim 1 wherein the heat rejection apparatus includes at least one cooling tower.

4. The heat exchanger system of claim 1 wherein the optimal operating parameter includes at least one of an operating mode of the heat rejection apparatus, a temperature of the process fluid leaving the heat rejection apparatus, a pressure of the process fluid leaving the heat rejection apparatus, and a flow rate of the process fluid.

5. The heat exchanger system of claim 1 wherein the processor circuitry is configured to provide the variable and the plurality of potential operating parameters of the cooling system to the machine learning model to estimate energy consumption and water usage based on the potential operating parameters; and
    the processor circuitry is configured to determine, based at least in part on the estimated energy consumption and water usage, the optimal operating parameter of the cooling system to satisfy the target optimization criterion.

6. The heat exchanger system of claim 5 wherein the plurality of potential operating parameters includes a first plurality of potential operating parameters and a second plurality of potential operating parameters;
    wherein the machine learning model includes a first machine learning model to estimate energy consumption of the cooling system and a second machine learning model to estimate water usage; and
    wherein the processor circuitry is configured to provide the first plurality of potential operating parameters to the first machine learning model to estimate energy consumption of the cooling system and provide the second plurality of potential operating parameters to the second machine learning model to estimate water usage of the cooling system.

7. The heat exchanger system of claim 1 wherein the processor circuitry is configured to provide the plurality of potential operating parameters of the cooling system to the machine learning model to estimate chemical consumption based on the potential operating parameters; and
    the processor circuitry is configured to determine, based at least in part on the chemical consumption, the optimal operating parameter of the cooling system to satisfy the target optimization criterion.

8. The heat exchanger system of claim 1 wherein the processor circuitry is configured to estimate a future operating condition;
    wherein the processor circuitry is configured to provide a plurality of future potential operating parameters of the cooling system associated with the future operating condition to the machine learning model to estimate at least one of future energy consumption, future water usage, and future chemical consumption, based on the future potential operating parameters;
    the processor circuitry is further configured to determine the optimal operating parameter of the cooling system to satisfy the target optimization criterion based on at least one of:
    energy consumption;
    water usage;
    chemical consumption;
    future energy consumption;
    future water usage; and
    future chemical consumption.

9. The heat exchanger system of claim 1 wherein the plurality of potential operating parameters provided to the machine learning algorithm include a range of operating parameters within operating constraints of the cooling system.

10. The heat exchanger system of claim 1 wherein the plurality of potential operating parameters include at least one of a fan speed operating parameter and a water usage operating parameter of the heat rejection apparatus.

11. The heat exchanger system of claim 1 wherein the sensor includes a plurality of sensors configured to detect a plurality of variables including:
    a water usage variable of the cooling system;
    an energy consumption variable of the cooling system; and
    at least one of a leaving process fluid temperature variable of the heat rejection apparatus and a leaving process fluid pressure variable of the heat rejection apparatus.

12. The heat exchanger system of claim 1 wherein the sensor includes sensors configured to detect a variable of a process fluid leaving the heat rejection apparatus and a variable of an environment of the cooling system.

13. The heat exchanger system of claim 1 wherein the processor is configured to identify a malfunction of the cooling system, the processor configured to determine the plurality of potential operating parameters to provide to the at least one machine learning model representative based at least in part on the identified malfunction.

14. The heat exchanger system of claim 1 wherein the heat rejection apparatus includes a plurality of cooling towers, wherein at least one of the cooling towers is operable in a dry mode and at least one of the cooling towers is operable in a wet mode or an adiabatic mode.

15. The heat exchanger system of claim 1 wherein the heat rejection apparatus includes a plurality of cooling towers; and
wherein the optimal operating parameter includes a parameter indicative of whether the cooling towers operate in a series or parallel configuration.

16. The heat exchanger system of claim 1 wherein the heat rejection apparatus includes a thermal energy storage system; and
wherein the optimal operating parameter includes a parameter indicating whether the thermal energy storage system is charging thermal energy or discharging thermal energy.

17. A heat rejection apparatus for a cooling system, the heat rejection apparatus comprising:
a cooling tower comprising an evaporative heat exchanger operable to cool process fluid;
a sensor configured to detect a variable of the cooling tower at a first time; and
a controller operably coupled to the cooling tower and the sensor, the controller configured to implement an optimal operating parameter for the cooling tower as the cooling tower operates at a second time to satisfy a target optimization criterion;
the optimal operating parameter being determined at least in part by providing the variable and a plurality of potential operating parameters for operating the cooling tower at the second time to a machine learning model representative of the cooling tower to estimate power consumption and water usage at the second time for each of the potential operating parameters.

18. The heat rejection apparatus of claim 17 wherein the sensor variable of the cooling tower includes a variable of process fluid leaving the cooling tower; and
wherein the optimal operating parameter causes the cooling tower to operate such that the variable of the process fluid leaving the cooling tower corresponds to an optimal variable of the process fluid.

19. The heat rejection apparatus of claim 17 wherein the target optimization criterion is minimizing energy consumption, minimizing water usage, or minimizing cost.

20. The heat rejection apparatus of claim 17 wherein the optimal operating parameter includes at least one of an operating mode of the cooling tower, a temperature of the process fluid leaving the cooling tower, a pressure of the process fluid leaving the cooling tower, and a flow rate of the process fluid.

21. The heat rejection apparatus of claim 17 wherein the controller is configured to provide the variable and the plurality of potential operating parameters of the cooling tower to the machine learning model to estimate the energy consumption and water usage; and
wherein the controller is configured to determine, based at least in part on the estimated energy consumption and the water usage, the optimal operating parameter of the cooling system to satisfy the target optimization criterion.

22. The heat rejection apparatus of claim 21 wherein the controller is configured to implement a first target optimization criterion and implement a different, second target optimization criterion in response to a predetermined event.

23. The heat rejection apparatus of claim 21 wherein the controller is configured to estimate a future operating condition;
wherein the controller is configured to provide a plurality of future potential operating parameters of the cooling tower associated with the future operating condition to the machine learning model to estimate future energy consumption and future water usage based on the future potential operating parameters of the cooling tower;
wherein the controller is configured to determine the optimal operating parameter of the cooling tower to satisfy the target optimization criterion based on at least one of:
energy consumption;
water usage;
future energy consumption; and
future water usage.

24. The heat rejection apparatus of claim 21 wherein the plurality of potential operating parameters includes a first plurality of potential operating parameters and a second plurality of potential operating parameters;
wherein the machine learning model includes a first machine learning model to estimate energy consumption of the cooling tower and a second machine learning model to estimate water usage; and
wherein the processor circuitry is configured to provide the first plurality of potential operating parameters to the first machine learning model to estimate energy consumption of the cooling tower and provide the second plurality of potential operating parameters to the second machine learning model to estimate water usage of the cooling tower.

25. The heat rejection apparatus of claim 17 wherein the plurality of potential operating parameters provided to the machine learning algorithm include a range of operating parameters within operating constraints of the cooling tower.

26. The heat rejection apparatus of claim 17 wherein the plurality of potential operating parameters include fan speed and a water usage variable of the cooling tower.

27. The heat rejection apparatus of claim 17 wherein the sensor includes a plurality of sensors configured to detect variables including:
a water usage variable of the cooling tower;
an energy consumption variable of the cooling tower; and
at least one of a leaving process fluid temperature variable and a leaving process fluid pressure variable of the cooling tower; and
wherein the controller is configured to provide the variables and the plurality of potential operating parameters of the cooling tower to the machine learning model to estimate energy consumption and water usage.

28. The heat rejection apparatus of claim 17 wherein the evaporative heat exchanger includes an indirect heat exchanger configured to receive the process fluid and an evaporative liquid distribution system configured to distribute evaporative liquid onto the indirect heat exchanger.

29. The heat rejection apparatus of claim 17 wherein the controller is configured to identify a malfunction in the cooling tower, the plurality of potential operating parameters of the cooling tower determined based at least in part on the identified malfunction.

30. The heat rejection apparatus of claim 17 wherein the optimal operating parameter is determined at least in part by providing the variable and the plurality of potential operating parameters of the cooling tower to the machine learning model representative of the cooling tower to estimate power consumption, water usage, and chemical consumption for the potential operating parameters.

31. A method for operating a cooling system, the method comprising:
at a processor associated with a cooling system:
receiving a variable of the cooling system detected by a sensor of the cooling system at a first time;
providing the variable and a plurality of potential operating parameters for operating the cooling system at a second time to a machine learning model representative of the cooling system to estimate at least one of energy consumption, water usage, and chemical usage of the cooling system for each of the potential operating parameters;
determining, based at least in part on the estimated at least one of energy consumption, water usage, and chemical usage for the potential operating parameters, an optimal operating parameter of the cooling system to satisfy a target optimization criterion; and
effecting utilization of the optimal operating parameter by the cooling system as the cooling system operates at the second time.

32. The method of claim 31 wherein effecting utilization of the optimal operating parameter by the cooling system includes communication circuitry operably coupled to the processor communicating the optimal operating parameter to the cooling system via a network.

33. The method of claim 31 wherein the cooling system includes a cooling tower; and
wherein the optimal operating parameter includes a plurality of optimal operating parameters of the cooling tower.

34. The method of claim 31 wherein the target optimization criterion is minimizing energy consumption, minimizing water usage, minimizing chemical consumption, or minimizing cost.

35. The method of claim 31 wherein the optimal operating parameter includes at least one of an operating mode of a heat rejection apparatus of the cooling system, a temperature of process fluid leaving a heat rejection apparatus of the cooling tower, a pressure of the process fluid leaving the heat rejection apparatus, and a flow rate of the process fluid.

36. The method of claim 31 wherein providing the variable and the plurality of potential operating parameters of the cooling system to the machine learning model includes providing the variable and the plurality of potential operating parameters to the machine learning model to estimate energy consumption and water usage based on the potential operating parameters;
wherein determining the optimal operating parameter to satisfy the target optimization criterion includes determining the optimal operating parameter based at least in part on the estimated energy consumption and the target optimization criterion.

37. The method of claim 31 wherein providing the plurality of potential operating parameters of the cooling system to the machine learning model includes providing the plurality of potential operating parameters to the machine learning model to estimate chemical usage based on the potential operating parameters;
wherein determining the optimal operating parameter to satisfy the target optimization criterion includes determining the optimal operating parameter based at least in part on the estimated chemical consumption.

38. The method of claim 31 wherein the plurality of potential operating parameters includes a first plurality of potential operating parameters and a second plurality of potential operating parameters;
wherein the machine learning model includes a first machine learning model to estimate energy consumption of the cooling system and a second machine learning model to estimate water usage; and
wherein providing the variable and the plurality of potential operating parameters to the machine learning model includes providing the first plurality of potential operating parameters to the first machine learning model to estimate energy consumption of the cooling system and providing the second plurality of potential operating parameters to the second machine learning model to estimate water usage of the cooling system.

39. The method of claim 31 wherein the plurality of potential operating parameters include at least one of a fan speed operating parameter and a water usage operating parameter of a heat rejection apparatus of the cooling system.

40. The method of claim 31 wherein receiving the variable of the cooling system detected by the sensor of the cooling system includes receiving variables detected by sensors of the cooling system, the variables including:
a water usage variable of the cooling system;
an energy consumption variable of the cooling system; and
at least one of a leaving process fluid temperature variable of a heat rejection apparatus of the cooling system and a leaving process fluid pressure variable of the heat rejection apparatus.

41. The method of claim 31 further comprising:
at the processor associated with the cooling system:
estimating a future operating condition;
providing a plurality of future potential operating parameters of the cooling system associated with the future operating condition to the machine learning model to estimate at least one of future energy consumption, future water usage, and future chemical consumption; and
determining the optimal operating parameter of the cooling system to satisfy the target optimization criterion based on at least one of:
energy consumption;
water usage;
chemical consumption
future energy consumption;
future water usage; and
future chemical consumption.

42. The method of claim 31 further comprising changing the target optimization criterion in response to a predetermined event.

43. The method of claim 31 wherein the plurality of potential operating parameters of the cooling system are determined based at least in part on a detected malfunction in the cooling system.

44. The heat exchanger system of claim 1 wherein the heat rejection apparatus comprises:

an evaporative cooler;
an evaporative condenser; and/or
an adiabatic cooler.

45. The heat exchanger system of claim 1 wherein the target optimization criterion is minimizing cost.

46. The heat exchanger system of claim 1 wherein the heat rejection apparatus comprises a dry indirect heat exchanger.

47. The heat exchanger system of claim 1 wherein the processor circuitry is configured to predict a malfunction of the cooling system based upon actual operating data of the cooling system and/or estimated operating data of the cooling system.

48. A heat exchanger system comprising:
a cooling system comprising:
a heat generating apparatus configured to transfer heat to a process fluid;
a heat rejection apparatus configured to remove heat from the process fluid;
a sensor configured to detect a variable of the cooling system at a first time;
processor circuitry operably coupled to the sensor and configured to provide the variable and a plurality of potential operating parameters for operating the cooling system at a second time to a machine learning model representative of the cooling system to estimate at least one of energy consumption, water usage, and chemical usage of the cooling system for each of the potential operating parameters;
the processor circuitry configured to determine, based at least in part on the estimated at least one of energy consumption, water usage, and chemical consumption for the potential operating parameters, an optimal operating parameter of the cooling system to minimize greenhouse gas emissions associated with operation of the cooling system; and
the processor circuitry configured to cause the cooling system to utilize the optimal operating parameter as the cooling system operates at the second time.

49. The heat exchanger system of claim 48 wherein the greenhouse gas emissions comprise CO2 emissions associated with operation of the cooling system.

50. The heat exchanger system of claim 48 wherein the processor circuitry is configured to determine the optimal operating parameter of the cooling system to minimize greenhouse gas emissions based at least in part upon data indicative of carbon dioxide emissions associated with electrical power available to the cooling system.

51. A heat exchanger system comprising:
a cooling system comprising:
a heat generating apparatus configured to transfer heat to a process fluid;
a heat rejection apparatus configured to remove heat from the process fluid;
a sensor configured to detect a variable of the cooling system;
processor circuitry operably coupled to the sensor and configured to provide the variable and a plurality of potential operating parameters for the cooling system to a machine learning model representative of the cooling system to estimate at least one of energy consumption, water usage, and chemical usage of the cooling system for the potential operating parameters;
the processor circuitry configured to determine, based at least in part on the estimated at least one of energy consumption, water usage, and chemical consumption for the potential operating parameters, an optimal operating parameter of the cooling system to minimize greenhouse gas emissions associated with operation of the cooling system;
the processor circuitry configured to cause the cooling system to utilize the optimal operating parameter;
wherein the processor circuitry is configured to determine the optimal operating parameter of the cooling system to minimize greenhouse gas emissions including:
determining a first optimal operating parameter that minimizes water consumption in response to a variable indicative of carbon dioxide emissions associated with electrical power available to the cooling system being below a first threshold; and
determining a second optimal operating parameter that minimizes energy consumption in response to the variable exceeding a second threshold.

52. A heat exchanger system comprising:
a cooling system comprising:
a heat generating apparatus configured to transfer heat to a process fluid;
a heat rejection apparatus configured to remove heat from the process fluid;
a sensor configured to detect a variable of the cooling system;
processor circuitry operably coupled to the sensor and configured to provide the variable and a plurality of potential operating parameters for the cooling system to a machine learning model representative of the cooling system to estimate at least one of energy consumption, water usage, and chemical usage of the cooling system for the potential operating parameters;
the processor circuitry configured to determine, based at least in part on the estimated at least one of energy consumption, water usage, and chemical consumption for the potential operating parameters, an optimal operating parameter of the cooling system to minimize greenhouse gas emissions associated with operation of the cooling system;
the processor circuitry configured to cause the cooling system to utilize the optimal operating parameter;
wherein the processor circuitry is configured to determine the optimal operating parameter of the cooling system to minimize greenhouse gas emissions associated with operation of the cooling system based at least in part upon:
an electrical power source for the cooling system; and
the estimated at least one of energy consumption, water usage, and chemical consumption for the potential operating parameters.

53. The heat exchanger system of claim 48 wherein the heat rejection apparatus includes a thermal energy storage system; and
wherein the optimal operating parameter includes a parameter indicating whether the thermal energy storage system is charging thermal energy or discharging thermal energy.

54. An apparatus comprising:
a heat exchange system comprising:
a heat source configured to transfer heat to a process fluid;
a heat rejection apparatus configured to remove heat from the process fluid;
a sensor configured to detect a variable of the heat exchange system at a first time;
processor circuitry operably coupled to the sensor and configured to provide the variable and a plurality of potential operating parameters for operating the heat exchange system at a second time to a machine learning model representative of the heat exchange system to estimate at least one of energy consumption, water usage, and chemical usage of the heat exchange system for each of the potential operating parameters;

the processor circuitry configured to determine, based at least in part on the estimated at least one of energy consumption, water usage, and chemical consumption for the potential operating parameters, an optimal operating parameter of the heat exchange system to satisfy a target optimization criterion; and the processor circuitry configured to cause the heat exchange system to utilize the optimal operating parameter as the heat exchange system operates at the second time.

55. The heat exchanger system of claim 52 wherein the processor circuitry is configured to determine the optimal operating parameter of the cooling system to minimize greenhouse gas emissions based at least in part upon data indicative of carbon dioxide emissions associated with electrical power source available to the cooling system.

* * * * *